US012670571B2

(12) United States Patent 
Ma et al.

(10) Patent No.: US 12,670,571 B2 
(45) Date of Patent: Jun. 30, 2026

(54) SYSTEM AND METHOD FOR TOMOGRAPHIC IMAGING

(71) Applicant: Mitsubishi Electric Research Laboratories, Inc., Cambridge, MA (US)

(72) Inventors: Yanting Ma, Cambridge, MA (US); Qingqing Zhao, Cambridge, MA (US); Hassan Mansour, Cambridge, MA (US); Petros Boufounos, Cambridge, MA (US); Saleh Nabi, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 530 days.

(21) Appl. No.: 18/192,353

(22) Filed: Mar. 29, 2023

(65) Prior Publication Data

US 2024/0331127 A1    Oct. 3, 2024

(51) Int. Cl. 
*G06T 7/00*         (2017.01)

(52) U.S. Cl. 
CPC ........................ *G06T 7/0004* (2013.01); *G06T 2207/10044* (2013.01); *G06T 2207/10072* (2013.01); 
(Continued)

(58) Field of Classification Search 
CPC ...... G01S 13/44; G01S 13/885; G01S 13/888; G01S 13/89; G01S 15/42; G01S 15/88; 
(Continued)

(56) References Cited

U.S. PATENT DOCUMENTS

| | | | | |
|---|---|---|---|---|
| 5,905,261 | A | * 5/1999 | Schotland | .......... G01N 21/4795 250/341.8 |
| 6,618,463 | B1 | * 9/2003 | Schotland | .......... G02B 21/0004 378/4 |

(Continued)

OTHER PUBLICATIONS

Yan Yang et al., "Seismic Wave Propagation and Inversion with Neural Operators," Nov. 2, 2021, The Seismic Record. 1(3), doi: 10.1785/0320210026, pp. 126-133.*

(Continued)

*Primary Examiner* — Omar S Ismail 
(74) *Attorney, Agent, or Firm* — Gene Vinokur

(57)            ABSTRACT

A tomographic imaging system is provided. The system receives measurements at frequencies of a wave-field scattered by an internal structure of an object, recursively reconstructs an image of the internal structure of the object until a termination condition is met, and renders the reconstructed image. For a current iteration, a frequency is added to previous frequencies used during a previous iteration to produce current frequencies, such that the added frequency is higher than frequencies present in the previous frequencies, and reconstructs a current image of the internal structure of the object that minimizes a difference between the scattered wave-field measured at the current frequencies and a wave-field synthetized from the current image. The wave-field synthesized from the current image is generated by a neural network operator. A previous image determined during the previous iteration initializes the reconstruction of the current image.

20 Claims, 14 Drawing Sheets

(52) U.S. Cl.
CPC ............... *G06T 2207/20081* (2013.01); *G06T 2207/20084* (2013.01)

(58) Field of Classification Search
CPC ........ G01S 7/2921; G01S 7/417; G01S 7/418; G01S 7/5273; G01S 7/539; G06T 2207/10044; G06T 2207/10072; G06T 2207/20081; G06T 2207/20084; G06T 7/0004; G06V 10/82
See application file for complete search history.

(56) References Cited

U.S. PATENT DOCUMENTS

| | | | | |
|---|---|---|---|---|
| 7,725,169 | B2 * | 5/2010 | Boppart ............... | A61B 5/0073 600/407 |
| 11,204,317 | B2 | 12/2021 | Merl | |
| 2003/0099329 | A1 * | 5/2003 | Schotland .......... | G01N 21/4795 378/210 |
| 2006/0287596 | A1 * | 12/2006 | Johnson ............... | A61B 5/4312 600/437 |
| 2006/0293597 | A1 * | 12/2006 | Johnson ............... | A61B 5/4312 600/437 |
| 2007/0282200 | A1 * | 12/2007 | Johnson .................. | G06T 12/20 600/407 |
| 2008/0015448 | A1 * | 1/2008 | Keely .................. | A61B 5/0068 600/562 |
| 2012/0096601 | A1 * | 4/2012 | Schotland .............. | B82Y 35/00 850/30 |
| 2013/0169969 | A1 * | 7/2013 | Popescu ............. | G01B 9/02091 356/450 |
| 2015/0279082 | A1 * | 10/2015 | Anderson ............... | G06T 15/08 345/424 |
| 2016/0025878 | A1 * | 1/2016 | Shin ........................ | G01V 1/282 367/7 |
| 2016/0135694 | A1 * | 5/2016 | van Dorp ............. | A61B 5/7278 600/430 |
| 2016/0320506 | A1 * | 11/2016 | Almuhaidib ........... | G01V 1/282 |
| 2018/0129865 | A1 * | 5/2018 | Zia ......................... | G06V 10/82 |
| 2018/0218519 | A1 * | 8/2018 | Almutiry ................ | G06T 12/30 |
| 2019/0266436 | A1 * | 8/2019 | Prakash ................. | G06V 10/82 |
| 2020/0120233 | A1 * | 4/2020 | Annunziata ............ | G06N 3/045 |
| 2021/0353149 | A1 * | 11/2021 | Abbosh ................ | A61B 5/0042 |

OTHER PUBLICATIONS

Zahra Turani et al., "Refractive index correction in optical coherence tomography images of multilayer tissues," Jul. 10, 2018, Journal Biomedical Optics, Jul. 2018, vol. 23(7), pp. 070501-1-4.*

Shangjie Ren, "Interface and permittivity simultaneous reconstruction in electrical capacitance tomography based on boundary and finite-elements coupling method," Mar. 7, 2016, The Royal Society, rsta.royalsocietypublishing.org Phil. Trans. R. Soc. A 374: 20150333,pp. 1-11.*

Yunan Yang et al., "Application of optimal transport and the quadratic Wasserstein metric to full-waveform inversion," Jan. 5, 2018, Geophysics, vol. 83, No. 1 (Jan.-Feb. 2018),pp. R43-R60.*

Mateusz Heesch et al., "Diagnostic-Quality GuidedWave Signals Synthesized Using Generative Adversarial Neural Networks," May 19, 2022, Sensors 2022, 22, 3848,https://doi.org/10.3390/s22103848,pp. 1-8.*

Haowen Zhou et al., "FPM-INR: Fourier ptychographic microscopy image stack reconstruction using implicit neural representations," Oct. 31, 2023, arXiv:2310.18529v2,pp. 1-9.*

Yue Wu et al., "InversionNet: An Efficient and Accurate Data-Driven Full Waveform Inversion," Jan. 13, 2020, IEEE Transactions on Computational Imaging, vol. 6, 2020,pp. 419-431.*

Chao Song et al., "Wavefield Reconstruction Inversion via Physics-Informed Neural Networks," Feb. 11, 2022, IEEE Transactions on Geoscience and Remote Sensing, vol. 60, 2022, 5908012,pp. 1-9.*

Yanhua O. Yuan et al., "Multiscale adjoint waveform-difference tomography using wavelets," May 22, 2014, Geophysics, vol. 79, No. 3 (May-Jun. 2014);pp. WA79-WA90.*

Yan Yang, Angela F. Gao, Jorge C. Castellanos, Zachary E. Ross, Kamyar Azizzadenesheli, and RobertW. Clayton, "Seismic wave propagation and inversion with neural operators," 2021.

YueWu and Youzuo Lin, "InversionNet: An efficient and accurate data-driven full waveform inversion," IEEE Transactions on Computational Imaging, vol. 6, pp. 419-433, 2020.

* cited by examiner

Radar Waves          Object          Data Collection

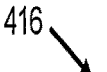
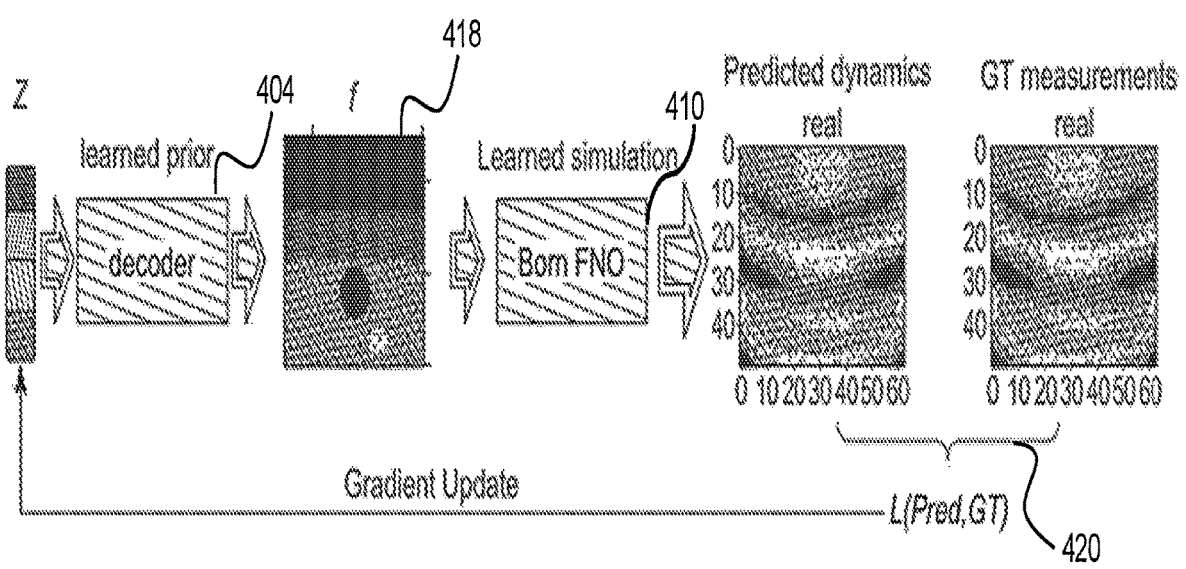
FIG. 4C

500

| | |
|---|---|
| ————— | 10 MHz |
| — · — | 10-20 MHz |
| · · · · · | 10-30 MHz |
| — · — | 10-40 MHz |
| — · — | 10-50 MHz |

502

510

508

506

514

516

512

518

Cost function

Reflectivity parameter c/100

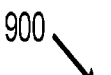
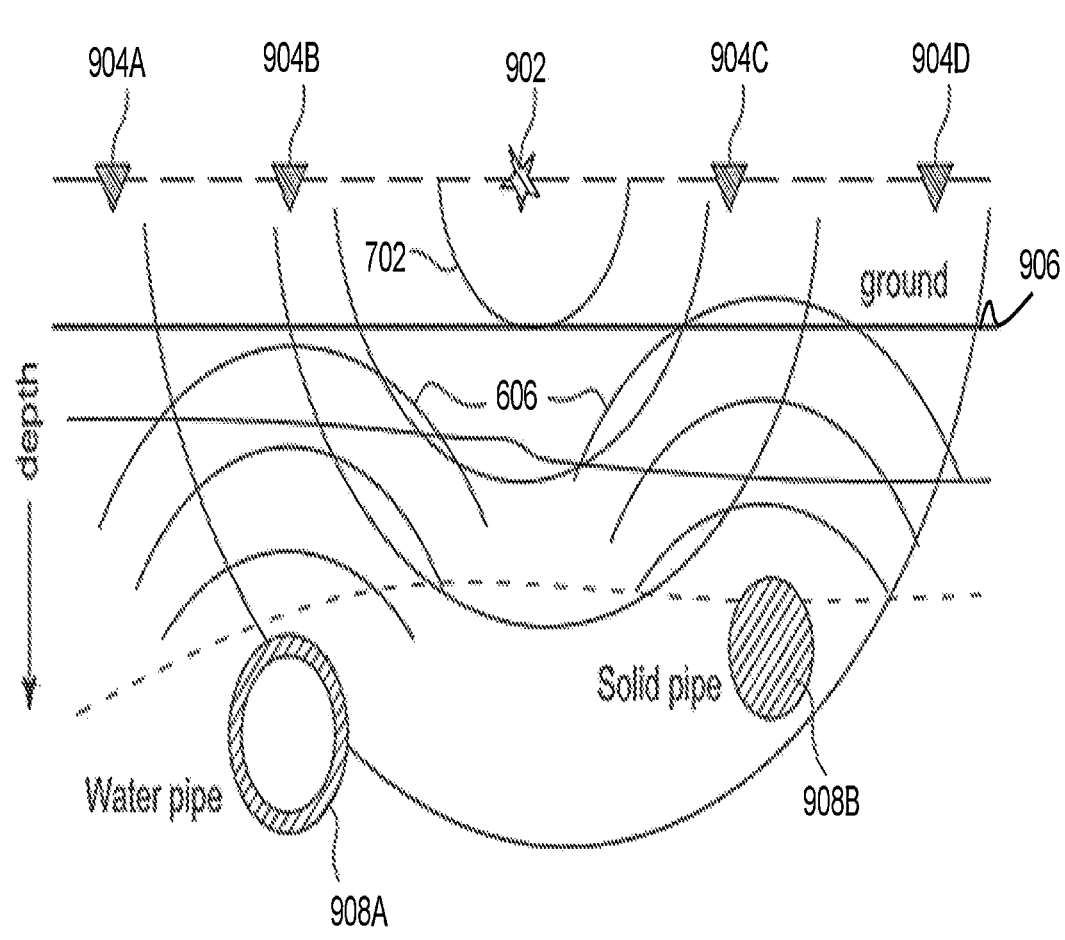
FIG. 9

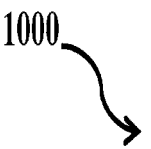

1000

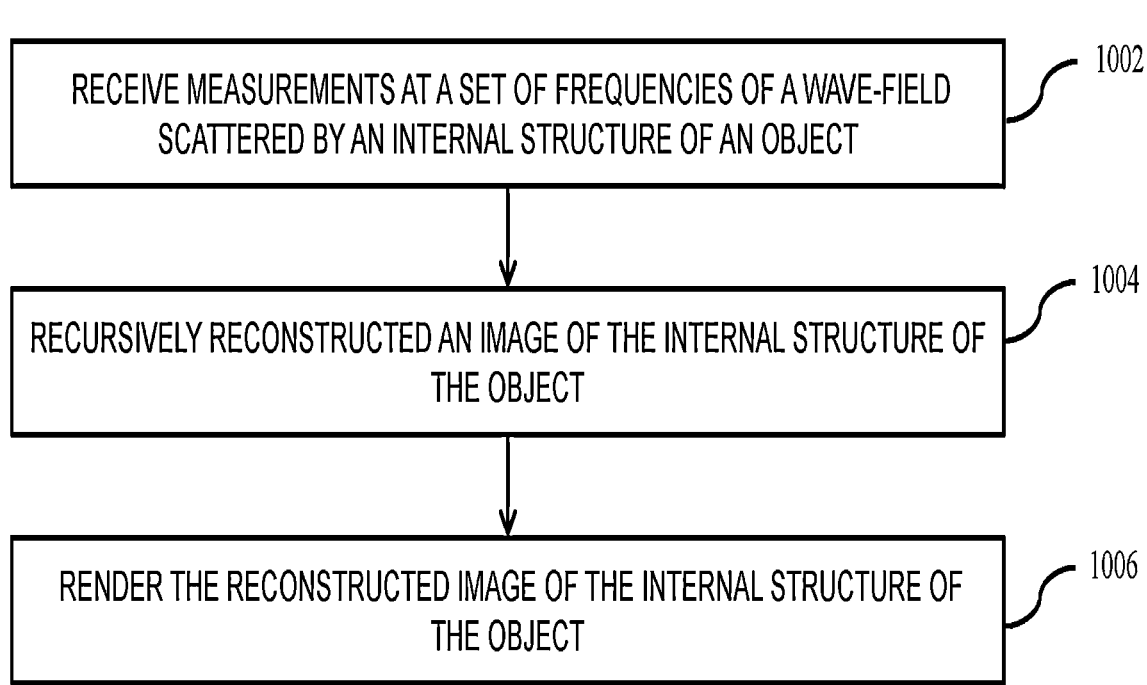

```
┌──────────────────────────────────────────────────────────┐
│  RECEIVE MEASUREMENTS AT A SET OF FREQUENCIES OF A WAVE-  │   1002
│  FIELD SCATTERED BY AN INTERNAL STRUCTURE OF AN OBJECT    │
└──────────────────────────────────────────────────────────┘
                            │
                            ▼
┌──────────────────────────────────────────────────────────┐
│  RECURSIVELY RECONSTRUCTED AN IMAGE OF THE INTERNAL       │   1004
│  STRUCTURE OF THE OBJECT                                  │
└──────────────────────────────────────────────────────────┘
                            │
                            ▼
┌──────────────────────────────────────────────────────────┐
│  RENDER THE RECONSTRUCTED IMAGE OF THE INTERNAL STRUCTURE │   1006
│  OF THE OBJECT                                            │
└──────────────────────────────────────────────────────────┘
```

FIG. 10

SYSTEM AND METHOD FOR TOMOGRAPHIC IMAGING

TECHNICAL FIELD

This invention relates to tomography, and more specifically to systems and method for tomographic imaging for reconstructing an image of internal structure of an object by solving an inverse scattering problem with the aid of a deep learning operator that models physics of wave propagation.

BACKGROUND

An object, such as human body, a rock, etc. may be made up of one or more types of materials. For example, the human body may be made up of tissues, bones, skin, muscle, blood, water, etc. Each material in an object may be regarded as a dielectric. Knowledge of spatial distribution of dielectric permittivity within the object is important for many applications such as microwave imaging, bio-microscopy, medical imaging, through-the-wall imaging (TWI), infrastructure monitoring, and seismic imaging. In particular, determination of the permittivity enables visualization of an internal structure of the object and characterization of its physical properties. For example, in microwave imaging, permittivity provides the structure and properties of the materials in the object. In bio-microscopy, the permittivity allows to visualize internal cell structure in three-dimensions. In TWI, the permittivity allows to learn the dielectric properties of the wall and to use that information to compensate for the delay of the signal propagating through the wall.

In a typical scenario, a transmitter emits a signal such as an electromagnetic (EM), light or acoustic pulse, which propagates through the object, reflects off various structures and corresponding materials inside the object, and propagates to a receiver antenna array. The composition of the object is then visualized by numerically generating an image that represents a distribution of the permittivity in the object. Example of such an image includes an image of refractive indices of materials inside the object. However, the received signals are resulted from multiple reflections and/or refractions of transmitted signals due to multiple scattering from the structures or materials in the object as well as structures or materials surrounding the object. As a result, a reconstructed image of the object may include artifacts depending on types of the materials present inside or around the object that clutter the reconstructed image and renders them full of noise. Moreover, the multiple scattering of the transmitted signals affects the received signals in a non-linear manner, thereby making reconstruction of the image more difficult.

Accordingly, there is a need to overcome the aforementioned drawbacks and reconstruct an image of spatial distribution of permittivity of a material in an object, such that the reconstruction accounts for multiple scattering of transmitted signals propagating through the object.

SUMMARY

It is an object of some embodiments of the present disclosure to reconstruct an image of internal structure of an object probed with electromagnetic and/or acoustic waves of finite bandwidth to measure scattered wave-field around the object. An incident wave-field propagating inside the object induces multiple scattering waves on boundaries of material inside the object. Consequently, the scattered waves contain information about the spatial distribution of the material properties. Due to non-invasive nature of imaging techniques to determine spatial distribution of materials inside and around an object has led to application of such imaging techniques in numerous fields, such as non-destructive testing, optical tomography, geophysical imaging, ground penetrating radar, and medical imaging. For example, spatial distribution of material properties in a reconstructed image may be represented by refractive indices of material(s) inside the object and/or distribution of permittivity of material(s) inside the object.

Some embodiments are based on the recognition that an image may be reconstructed based on the spatial distribution of material properties by solving an inverse scattering problem. In such a case, an input wave-field of a probing pulse is known, and scattered wave-field may have to be measured. The inverse scattering problem may be utilized to find a spatial distribution of the permittivity of the material that transforms the known input wave-field into received reflections of the scattered wave-field. However, the inverse scattering problem is ill-posed and difficult to solve.

Some embodiments are based on recognition that the drawbacks of the inverse scattering problem for reconstructing the internal structure of the object may be addressed by minimizing a cost function indicative of a difference between the scattered wave-field and a wave-field synthetized from the image of the internal structure of the object. However, the synthesizing of the wave-field may be inaccurate or may be infeasible if a structure of a background medium within which the object is located is complicated or is unknown. Therefore, it is an object of some embodiments of the present disclosure to provide method and system suitable for reconstructing the internal structure of the object when the background medium is complicated or unknown.

Some embodiments are based on the recognition that a type of the background medium, although complicated or unknown, belongs to a class of commonly observed background media from an application where the system for imaging the internal structure of the object would be deployed. Consequently, some embodiments of the present disclosure discloses determining a neural network operator that is trained based on training examples belonging to classes of commonly observed background media for different applications where the system for imaging may be deployed, to learn a mapping between an application and corresponding synthesized wave-fields of a corresponding background medium. It is an object of the embodiments of the present disclosure to deploy or utilize the trained neural network operator that learns the mapping into the inverse scattering problem for reconstructing the internal structure of the object in order to improve the quality of the wave-field synthetized from the image of the internal structure of the object.

Some embodiments are based on the recognition that a structure of the neural network operator may resemble an iterative Born approximation that describes physics of wave propagation. It is an object of the embodiments of the present disclosure to design the neural network operator using multiple concatenated layers of a Fourier Neural Operator (FNO) wherein parameters of the FNO within each layer are the same as in all the other layers, i.e., all the layers of the FNO are identical.

Some embodiments are based on the recognition that the type of the object to be imaged belongs to a class of target objects that are commonly observed in the application where the system for imaging would be deployed. Therefore, it another object of some embodiments of the present disclosure to determine a neural network auto-encoder model, composed of an encoder branch and a decoder branch. The neural network auto-encoder model learns to map an example object from the class of target objects to a low dimensional latent space vector, and learns to reverse map the low dimensional latent space vector back to the example object. Pursuant to embodiments of the present disclosure, the learned neural network auto-encoder model is incorporated into the inverse scattering problem for reconstructing the internal structure of the object by limiting a number of types of objects that can be reconstructed by the system for imaging to those that can only be generated by the decoder branch of the trained neural network auto-encoder model.

Some embodiments are based on the recognition that the input wave-field is scattered differently for different frequencies complicating the scattered wave-field and making a cost function highly non-linear with multiple local minima. Hence, the inverse scattering problem minimizing such a cost function is a challenging problem.

Some embodiments of the present disclosure are further based on the realization that a low frequency component of the incident wave-field is capable of penetrating further into the materials of the object and exhibits weaker interaction with the internal structure of the object compared to higher frequency components. Due to the weaker interaction, fewer scattering events occur during the penetration of low frequency wave-fields inside the materials of the object. Consequently, a measurement mismatch cost function corresponding to the low frequencies has fewer local minima compared to higher frequencies. The low frequency measurements contain less spatial detail compared to the higher frequency measurements, but they may serve to initialize optimization of the inverse scattering problem with the higher frequency measurements.

To that end, some embodiments are based on an incremental frequency inversion method. For example, in some embodiments, the incremental frequency inversion method recursively reconstructs an image of the internal structure of the object until a termination condition is met. For a current iteration, the method adds a frequency to a previous set of frequencies used during a previous iteration to produce a current set of frequencies and reconstructs a current image of the internal structure of the object that minimizes a difference between a portion of the scattered wave-field measured at the current set of frequencies and a wave-field synthetized from the current image. The added frequency is higher than any of one or more frequencies present in the previous set of frequencies. The wave-field synthesized from the current image is generated by a neural network operator trained to learn a mapping between an application and corresponding synthesized wave-fields of a corresponding background medium. Moreover, frequencies are added incrementally to the inverse scattering problem. In addition, a previous image determined during the previous iteration initializes the reconstruction of the current image. This initialization incrementally guides the solution of the inverse scattering problem toward a global minimizer.

The incremental frequency inversion method does not require a smooth initial model of the image to be reconstructed. In contrast, the incremental frequency inversion method derives such a model from low frequency measurements. In effect, the incremental frequency inversion method allows reconstructing the image of the internal structure of the object with a practical resolution and accuracy without a necessity for using prior information about the image.

Accordingly, an embodiment of the present disclosure discloses a tomographic imaging system, including an input interface to receive measurements at a set of frequencies of a wave-field scattered by an internal structure of an object; a processor configured to recursively reconstruct an image of the internal structure of the object until a termination condition is met; and an output interface configured to render the reconstructed image. For a current iteration of recursively reconstructing the image, the processor is configured to add a frequency to a previous set of frequencies used during a previous iteration to produce a current set of frequencies, wherein the added frequency is higher than one or more frequencies present in the previous set of frequencies. Further, the processor is configured to reconstruct a current image of the internal structure of the object that minimizes a difference between a portion of the scattered wave-field measured at the current set of frequencies and a wave-field synthetized from the current image. The wave-field synthesized from the current image is generated by a neural network operator, and a previous image determined during the previous iteration initializes the reconstruction of the current image.

Some embodiments are based on an understanding that architecture of the neural network operator includes a sequence of Fourier neural operator (FNO) modules with identical parameters enforced by training the neural network operator with machine learning.

The one or more processors are further configured to reconstruct the image of the internal structure of the object by solving an optimization problem that minimizes the difference between the measurements of the portion of the scattered wave-field and the synthetized wave-field.

Some embodiments are based on an understanding that the reconstructed image is an image of refractive indices of one or more materials inside the object.

Some embodiments are based on an understanding that the reconstructed image includes a distribution of permittivity of one or more materials inside the object.

In some embodiments, to reconstruct the current image, the one or more processors are further configured to determine an update of the current image of the internal structure of the object and an estimate of the scattered wave-field inside the object simultaneously, and minimize a sum of the differences between received reflections and synthesized reflections of reconstructed scattered wave-field for each frequency in the current set of frequencies based on the update of the current image and the estimate of the scattered wave-field. The estimate of the scattered wave-field has a structure corresponding to the current image at each frequency in the current set of frequencies.

In some embodiments, to determine the current image of the internal structure of the object and the estimate of the scattered wave-field inside the object simultaneously, the one or more processors are further configured to determine an estimate of the scattered wave-field based on a current estimate of the image of the internal structure of the object by simulating an interaction between a probing pulse and the scattered wave-field resulted by scattering the probing pulse with one or more materials inside the object. The one or more processors are further configured to determine an estimate of an adjoint scattered wave-field that compensates for a residual error between the received reflections and the synthesized reflections of the reconstructed scattered wave-field. The one or more processors are further configured to compute the update of the current image of the internal structure of the object based on the estimate of the scattered wave-field, the estimate of the adjoint scattered wave-field, and the residual error between the received reflections and the synthesized reflections of the reconstructed scattered wave-field, using an adjoint state equation.

In some embodiments, to determine the current image and the scattered wave-fields simultaneously, the one or more processors are further configured to form a Born Fourier Neural Operator (FNO) that approximates the interaction between the probing pulse, the scattered wave-field resulted by scattering the probing pulse with the one or more materials inside the object, and refractive indices of the one or more materials inside the object. The one or more processors are further configured to invert the Born FNO given an initialized current image to determine a Jacobian of the scattered wave-field with respect to the current image based on the refractive indices of the one or more materials. The one or more processors are further configured to update the current image based on the refractive indices of the one or more materials by minimizing a cost function between the received reflections in the set of frequency components and a synthesized scattered wave-fields obtained by combining the Jacobian of the scattered wave-field and a quasi-Newton descent direction of the cost function with respect to the image of the refractive indices of the one or more materials. The one or more processors are further configured to project the image of the refractive indices of the one or more materials onto a constrained total variation penalty function.

Some embodiments are based on an understanding that the cost function between the received reflections and the synthesized reflections of the reconstructed scattered wave-field in the set of frequency components includes one or a combination of: an Euclidean distance between each of the received reflections and the corresponding synthesized reflections, a norm distance between each of the received reflections and the corresponding synthesized reflections, or a summation of an Euclidean distance and a barrier function. The barrier function penalizes updating the image of the refractive indices of the one or more materials that have negative refractive indices and the barrier function is a summation of an exponential function taken to a negative power of every refractive index in the image of the refractive indices of the one or more materials.

Some embodiments are based on an understanding that the image of the refractive indices of the one or more materials is represented by a generator network that maps a low dimensional latent space representation to the image of the refractive indices of the one or more materials.

Some embodiments are based on an understanding that the generator network is determined as part of an auto-encoder network, where an encoder network of the auto-encoder network is configured to determine a low dimensional representation of the image of the refractive indices of the one or more materials in a low dimensional latent space and the generator network of the auto-encoder network is configured to decode the latent space representation to reproduce the image of the refractive indices of the one or more materials.

Some embodiments are based on an understanding that the constrained total variation penalty function is constrained by an upper bound. The one or more processors are further configured to initialize the upper bound for the current image, and update the upper bound at the start of every iteration using a Newton root-finding method that adds a ratio of the square of the Euclidean distance between the received reflections and the synthesized reflections of the reconstructed scattered wave-field and a polar function of the constrained total variation function applied to a product of the adjoint of the Born FNO and the difference between the received reflections and the synthesized reflections of the reconstructed scattered wave-field.

Some embodiments are based on an understanding that the Born FNO operator approximates the interaction between the probing pulse, the scattered wave-field resulted by scattering the probing pulse with the one or more materials inside the object, and the refractive indices of the one or more materials inside the object. A structure of the Born FNO is determined by concatenating multiple FNO modules into a multilayered neural network.

Some embodiments are based on an understanding that the object includes elements of an underground infrastructure.

Some embodiments are based on an understanding that the tomographic imaging system further comprises a set of transmitters configured to transmit one or more probing pulses into the object and a set of receivers configured to measure, at each frequency from the set of frequencies, one or combination of reflections and refractions of propagation of the one or more probing pulses through the object to produce the measurements of the wave-field. The one or more probing pulses include at least one of: an electromagnetic wave or an acoustic wave that occupies a frequency band including the set of frequencies.

Some embodiments are based on an understanding that the set of transmitters and the set of receivers are located on a same side of the object, such that the tomographic imaging system operates in a reflection mode.

Another embodiment discloses a tomographic imaging method that uses a processor coupled with stored instructions for implementing the method, wherein the instructions, when executed by the processor carry out steps of the method, including receiving measurements at a set of frequencies of a wave-field scattered by an internal structure of an object; recursively reconstructing an image of the internal structure of the object until a termination condition is met; and rendering the reconstructed image. For a current iteration, the method includes adding a frequency to a previous set of frequencies used during a previous iteration to produce a current set of frequencies, wherein the added frequency is higher than one or more frequencies present in the previous set of frequencies. The method further includes reconstructing a current image of the internal structure of the object that minimizes a difference between a portion of the scattered wave-field measured at the current set of frequencies and a wave-field synthetized from the current image, wherein the wave-field synthesized from the current image is generated by a neural network operator, and wherein a previous image determined during the previous iteration initializes the reconstruction of the current image.

Yet another embodiment discloses a non-transitory computer readable storage medium embodied thereon a program executable by a processor for performing a method, the method including receiving measurements at a set of frequencies of a wave-field scattered by an internal structure of an object; recursively reconstructing an image of the internal structure of the object until a termination condition is met; and rendering the reconstructed image. For a current iteration, the method includes adding a frequency to a previous set of frequencies used during a previous iteration to produce a current set of frequencies, wherein the added frequency is higher than one or more frequencies present in the previous set of frequencies. The method further includes reconstructing a current image of the internal structure of the object that minimizes a difference between a portion of the scattered wave-field measured at the current set of frequencies and a wave-field synthetized from the current image, wherein the wave-field synthesized from the current image is generated by a neural network operator, and wherein a previous image determined during the previous iteration initializes the reconstruction of the current image.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 4C illustrates a schematic of a process for solving an inverse problem to reconstruct an internal structure of an object, according to an example embodiment.

FIG. 5 illustrates a schematic of principles of the incremental frequency inversion method, according to an example embodiment.

FIG. 9 illustrates an exemplar schematic of a reflection setup, according to an example embodiment.

FIG. 10 illustrates an exemplar method for reconstructing an image, according to an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram only to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

It is an object of some embodiments to disclose a tomographic imaging system for reconstructing an image of an object such that internal structure of the object is identified. In an example, the tomographic imaging system is configured to reconstruct the image by solving an inverse scattering problem with the aid of a deep learning neural network operator that models physics of wave propagation. In particular, a structure of the neural network operator may resemble an iterative Born approximation that describes physics of wave propagation. The neural network operator learns a mapping into the inverse scattering problem for reconstructing the internal structure of the object in order to improve the quality of the wave-field synthetized from the image of the internal structure of the object.

Figure 1:
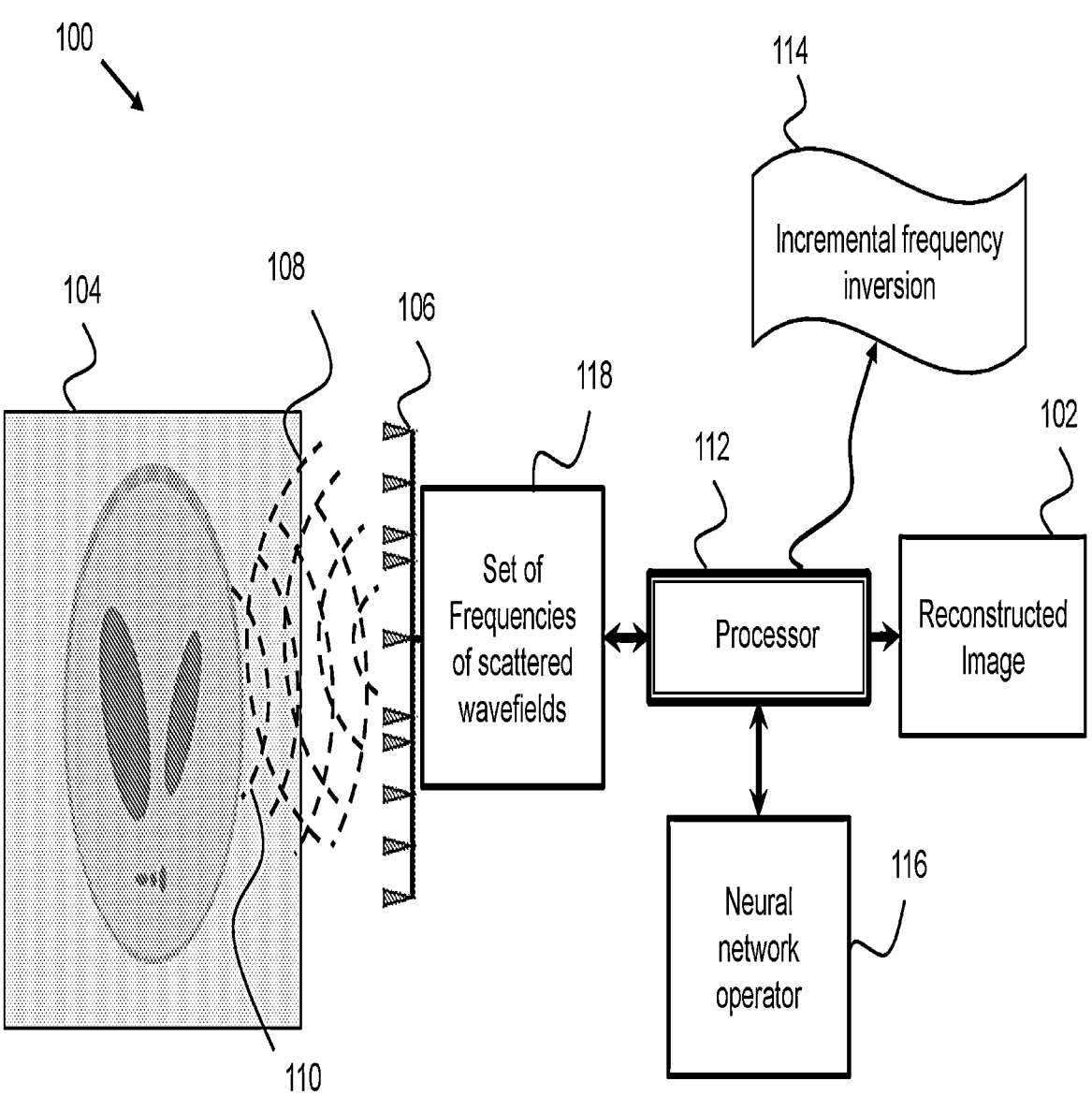
FIG. 1 illustrates a block diagram of a tomographic imaging system for determining an image of an internal structure of an object, according to an example embodiment.

FIG. 1 shows a block diagram of a tomographic imaging system 100 for determining an image 102 of an internal structure of an object 104, according to an example embodiment. The image 102 of the internal structure of the object 104 may be represented, for example, by an image formed based on refractive indices of one or more materials present inside the object 104, an image showing a spatial distribution of permittivity of the one or more materials inside the object, or a combination thereof. The tomographic imaging system 100 (referred to as system 100, hereinafter) includes and/or is operatively connected to at least one transceiver 106 to propagate a probing pulse of an incident wave-field 108 through the one or more materials of the object 104 and to receive a set of echoes 110 resulted from scattering the pulse by different portions or the one or more materials of the object 104.

For example, the transceiver 106 may include at least one transmitter that transmits the probing pulse to the object 104. The probing pulse of the incident wave-field 108 is scattered by the materials and produces the set of echoes 110. The probing pulse may be, for example, an electromagnetic wave, an acoustic wave, or an optical wave. The probing pulse may include, for example, one or a combination of a microwave pulse, a radar pulse, a laser pulse, an ultrasound pulse, and an acoustic pulse. The transceiver 106 may also include at least one receiver arranged at a predetermined location with respect to the transmitter for receiving the set of echoes 110. According to some embodiments, the system 100 may produce a two-dimensional or a three-dimensional image 102 of the object 104, where each location in the image 102 provides a value of the dielectric permittivity for a corresponding portion of material corresponding to the location.

The tomographic imaging system also includes a processor 112 operatively connected with the transceiver 106 to determine the image 102 based on the set of echoes 110. In order to reconstruct the image 102 of the object 104 despite the multiple scattering, the processor 112 separates the reconstruction into several stages by operating on a set of frequencies 118 of the scattered wave-fields. The processor 112 implements an incremental frequency inversion method 114 and uses a neural network operator 116 for reconstructing the internal structure of the object 104 by improving the quality of the synthetized wave-field from the image of the internal structure of the object for solving the inverse scattering problem in order efficiently. For example, in some embodiments, the incremental frequency inversion method 114 recursively reconstructs the image 102 of the internal structure of the object 104 for higher frequencies until a termination condition is met. Details of field of application of the system 100 is described in conjunction with, for example, FIG. 2A.

Figure 2A:
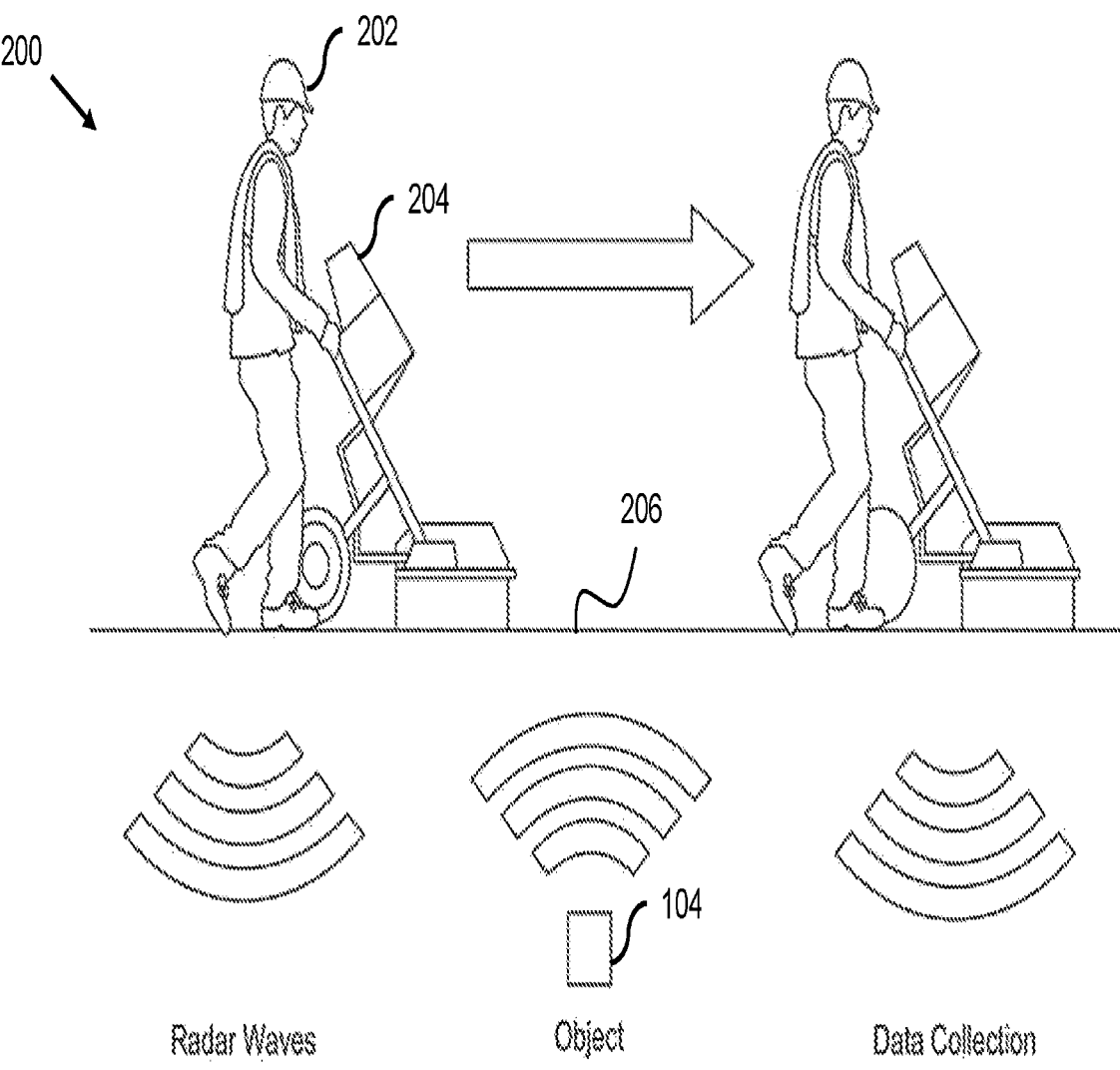
FIG. 2A illustrates a schematic of an application of a tomographic imaging system, according to an example embodiment.

FIG. 2A illustrates a schematic 200 of an application of the system 100, according to an example embodiment. Pursuant to present example, the system 100 is used for measurement acquisition process of a Ground Penetrating Radar (GPR) application. It may be noted that such an application of the system 100 is exemplary and should not be construed as a limitation. In other embodiments of the present disclosure, the system 100 may be used in applications, such as imaging of human body, geological exploration, oil or mineral extraction, and so forth.

For the Ground Penetrating Radar (GPR) application, an operator 202 may move an imaging device 204 loaded with radar. The imaging device 204 may include a transmitter that sends radar waves or probing pulses into the ground 206 and a receiver that receives reflections from the object 104 located under the ground 206 for data collection. Based on the received reflections of scattered wave-fields, the imaging device 204 may be configured to reconstruct an image of the object 104 that may be located under the ground 206.

It is an object of the embodiments of the present disclosure to provide a tomographic imaging system 100 that reconstructs an image of an object, such as an object under the ground, accurately. Such reconstructed image may indicate an internal structure of the object indicating, for example, a type, a nature, physical characteristics, and/or chemical characteristics of the object. In this regard, the tomographic imaging system 100 may use an inverse scattering problem to reconstruct the image. Details of the image scattering problem is described in conjunction with FIG. 2B.

Figure 2B:
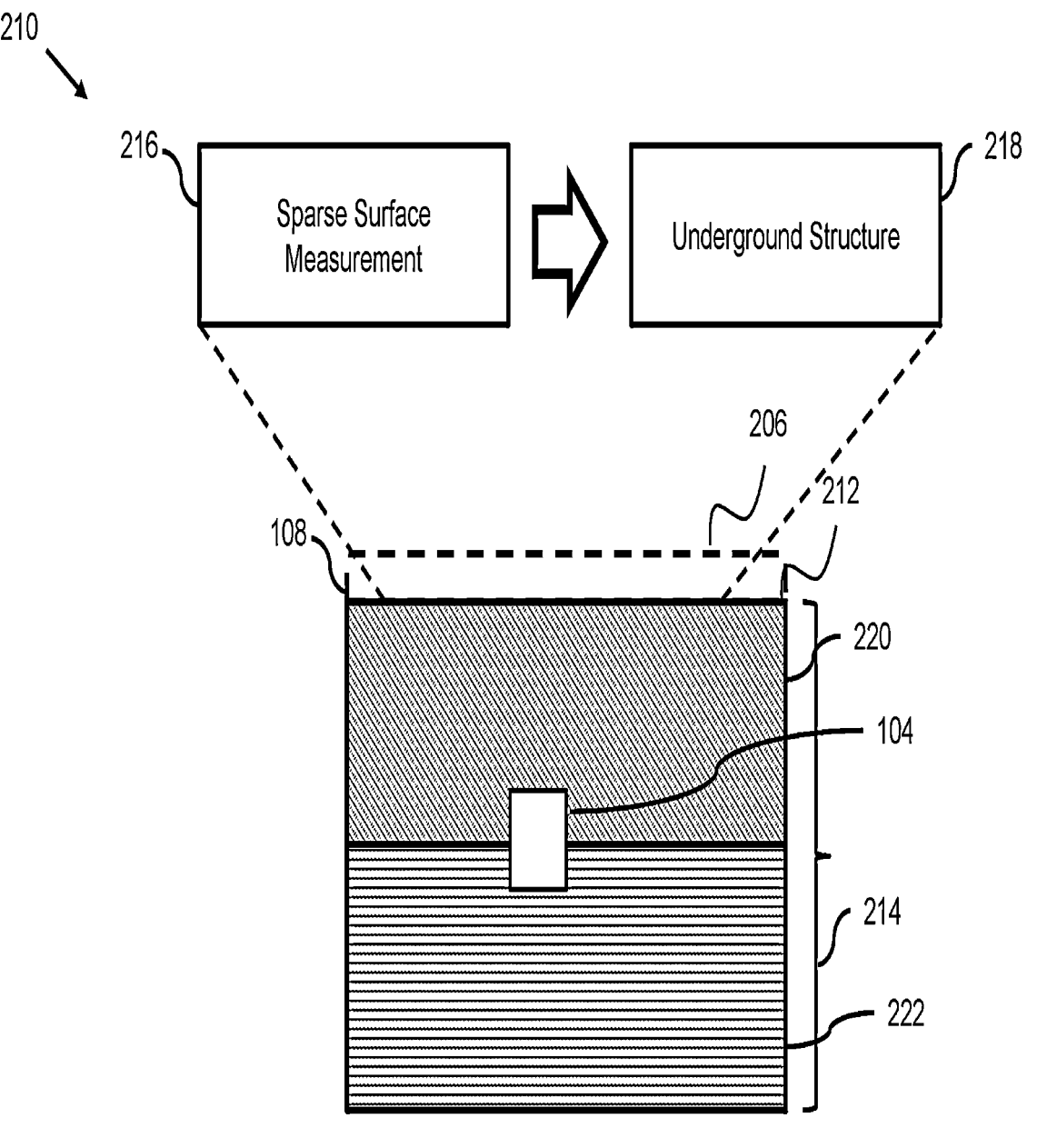
FIG. 2B illustrates a schematic of a task of an inverse scattering problem, according to an example embodiment.

FIG. 2B shows a schematic block diagram 210 of a task of an inverse scattering problem, according to an example embodiment. The inverse scattering problem aims to reconstruct an image of an internal structure 214 of the ground 104 by solving an optimization problem. The optimization problem is used to minimize a difference between measurements of a scattered wave-field, i.e., reflections received by the receiver of the system 100, and a synthesized wave-field, i.e., a synthetic wave-field generated from an image of the internal structure of the object 104.

In operation, a probing pulse comprising the incident wave-field 108 may be transmitted to the ground 206, via the system 102. Moreover, one or more objects, such as the object 104 may be located under the ground 206. Based on the received scattered wave-field, the image of the internal structure 214 or materials under the ground 206 and/or internal structure of the object 104 may be reconstructed. In this regard, an ill-posed inverse scattering problem for determining underground structure 218 composed of underground internal structure 214 of the ground 206 from sparse surface measurement 216. The inverse scattering problem is optimized based on an optimization problem to determine the internal structure 214 of the ground 206 comprising, for example, a first layer of background medium 220 and a second layer of background medium 222.

For example, a goal of the inverse scattering problem is to estimate underground internal structure 214, f, of the ground 206 given ground truth data, y, relating to the ground 206. In an example, the underground internal structure 214, f, may be estimated based on a distribution of permittivity across the background medium 220 and 222 as well as the object 104 present under the ground 206 and/or inside the object 104. In addition, information about a source of the probing pulse comprising the incident wave-field 108 and the background mediums 220 and 222 of the ground 206 is also necessary for computing an incident scattering field and the Green's function. In one example, f may be estimated by solving the optimization problem. The optimization problem is defined as:

$$f = \operatorname{argmin}_f \sum_\omega \frac{1}{2} \| y_\omega - \mathcal{Z}_\omega(f) \|_2^2 + \mathcal{R}(f) \qquad (1)$$

where $\mathcal{Z}_\omega$ is a forward operator that maps the permittivity constrict f to the corresponding wave-field measurements $y_\omega$ at frequency $\omega$ according to Eq. (10) and $\mathcal{R}$ is a regularizer.

In the GPR application, it may be reasonable to assume a layered structure for the background mediums 220 and 222 having layered permittivity distribution $\epsilon_b(x)$. However, a depth and a permittivity value for each layer of the background mediums 220 and 222 may be unknown. Moreover, computing a Green's function for a layered background is non-trivial. Alternatively, if free space is assumed as the layered background, then a domain of integration may be restricted to a bounded region without careful treatment of boundaries as the layered background structure extends outside a computational domain. To overcome the aforesaid drawbacks associated with the conventional inverse scattering problem, the updated inverse scattering problem is used along with the neural network operator 116.

Figure 3:
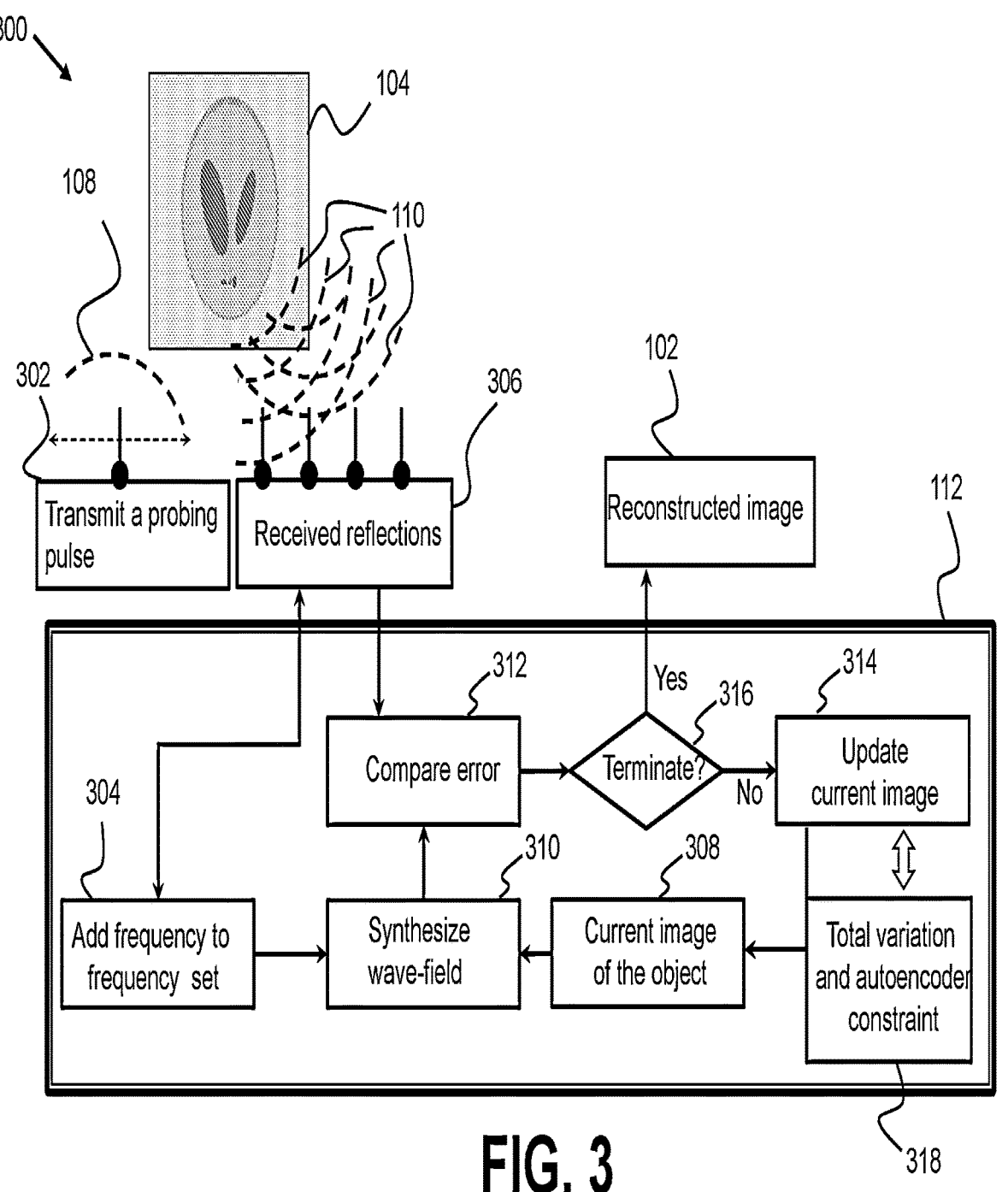
FIG. 3 illustrates a block diagram of a method for determining an image of an internal structure of an object, according to an example embodiment.

FIG. 3 shows a block diagram 300 of a method for determining the image 102 of an internal structure of the object 104, according to an example embodiment. The method may be implemented using the processor 112 of the system 100. For example, the method may be implemented by the processor 112 executing a program embodied on a non-transitory computer readable storage medium.

The method comprises, at 302, transmitting a probing pulse of the incident wave-field 108 through the object 104 to receive a set of echoes 110. In an example, the processor 112 is configured to transmit the probing pulse of the incident wave-field 108 through the materials of the object 102. For example, the processor 112 receives the pulse scattered by the materials in the form of the set of echoes 110. The echoes 100 are resulted from scattering the pulse by different portions or materials of the object 104.

The pulse of the incident wave-field 108 spans across a frequency band that includes a set of frequencies. For example, the set of frequencies is a product of quantization of a frequency band of the pulse of the incident wave-field 108. In one embodiment, the quantization is performed with resolution proportional to a length of a time by which the echoes 110 were sampled. This resolution allows reconstructing the necessary details of the image 102 indicating the internal structure of the object 104 such that frequency separation of quantization bins is small enough that adjacent frequency bins contain overlapping information on image detail. In another embodiment, the resolution is selected based on computational power of the processor 112. For example, a processor with limited memory would require that the quantization bins be larger, resulting in a smaller number of frequencies.

In an example, the processor 112 may be configured to transform the received reflections 306 into a digital signal using an analog-to-digital converter and to record amplitude and/or other properties of the digital signal. In some embodiments, the processor 112 may be configured to organize the received reflections 306 into an ordered set of frequencies 118 of scattered wave-fields. The ordered set of frequencies 118 may include frequencies that are ordered from a lowest frequency to a highest frequency.

According to the principles of the incremental frequency inversion 114, the method does not aim to reconstruct an image jointly for all frequencies at once. In contrast, the method according to the present disclosure reconstructs an image for a subset of frequency and incrementally adds the higher frequency in the subset to further refine the image. Eventually, the method processes all frequency. Due to the incremental frequency inversion 114, a previously determined image serves as a prior for reconstruction of a next image to improve the quality of image reconstruction. In this manner, the image 102 is reconstructed based on the plurality of frequencies of the frequency band in iterative manner.

To that end, at 304, the method comprises incrementally adding one or more frequencies from the received reflections 306 to a current set of frequencies. In particular, the processor 112 may be configured to start adding frequencies from lowest to highest to the current set of frequencies, at different iterations. For example, the processor 112 may be configured to initialize the current set of frequencies by placing the lowest frequency in the current set of frequencies. In a next iteration, a second lowest frequency may be added to the current set of frequencies, and so on.

Some embodiments are based on recognition that the inverse scattering problem for reconstructing the internal structure of the object 104 may be addressed by minimizing a cost function indicative of a difference between the received reflections and a reflections synthetized from an image of the internal structure of the object 104. However, input wave-field is scattered differently for different frequencies complicating the scattered wave-field and making the cost function highly non-linear with multiple local minima. Hence, the inverse scattering problem minimizing such a cost function is a challenging problem.

However, some embodiments are based on realization that the low frequency component of the incident wave-field is capable of penetrating further into the material of the object 104 and exhibits weaker interaction with the internal structure of the object 104 compared to higher frequency components. As a result of the weaker interaction, fewer scattering events occur during the penetration of low frequency wave-fields. Consequently, the measurement mismatch cost function corresponding to the low frequencies has fewer local minima compared to higher frequencies. The low frequency measurements contain less spatial detail compared to the higher frequency measurements, but they can serve to initialize optimization of the inverse scattering problem with the higher frequency measurements.

Some embodiments are based on understanding that it is easier to process each frequency separately, and later to reconstruct the image 102 together by stitching images of different frequencies in a frequency domain. However, this option is not suitable for reconstruction of the internal structure of the object 104 due to interdependencies of scattered wave-field on different frequency. To that end, some embodiments reconstruct the image 102 jointly for multiple frequencies. However, the frequencies are added incrementally to gradually initialize reconstruction until all frequencies are joined.

Continuing further with the method for reconstructing the image 102 of the internal structure of the object 104, at 308, a current image of the object 104 is reconstructed. For a particular iteration, the processor 112 is configured to update the current image based on the wave-field in the current set of frequencies and check a termination condition. For a current iteration, an image reconstruction of the current image is performed only using frequencies present in a current set of frequencies. To reconstruct the current image of the internal structure of the object 104 accurately, the method minimizes a difference between a portion of the scattered wave-field measured at the current set of frequencies and a wave-field synthesized from the current image.

At 310, a wave-field is synthetized for the current iteration. In some embodiments, the method uses a current image of the object from a previous iteration 104, i.e., a previous image reconstructed during the previous iteration, to synthesize a wave-field that is compared with the received reflections 306. For example, the wave-field synthesized from the current image of the previous iteration is generated by the neural network operator 116. Details of the structure of the neural network operator 116 is provided in. for example, FIG. 4B.

At 312, an error between the received reflections 306 and the synthesized wave-field is compared. Further, a determination is made to check if the error is smaller than a threshold. When the error is determined to be smaller than the threshold, the current image generated at the current iteration is output as the reconstructed image 102 of the internal structure of the object 104.

However, if the error is determined to be greater than the threshold, at 314, the current image generated in the current iteration is updated. The current image is updated in a manner such that the error is minimized. For example, some embodiments use different regularizers, at 318, to the update current image. Examples of the regularizers may include, but is not limited to, a total variation regularizer and auto-encoder constraint regularizer, for example, FIG. 4A.

Additionally, or alternatively, the method terminates when a determination is made, at 316, to check if all frequencies in the set of frequencies are processed. For example, the method terminates the process of reconstruction when all frequencies in the ordered set of frequencies 118 have been included in the current set of frequencies. In subsequent iterations, the processor may be configured to add a frequency from the ordered set of frequencies 118 such that the added frequency is higher than any frequency in the previous set of frequencies.

Figure 4A:
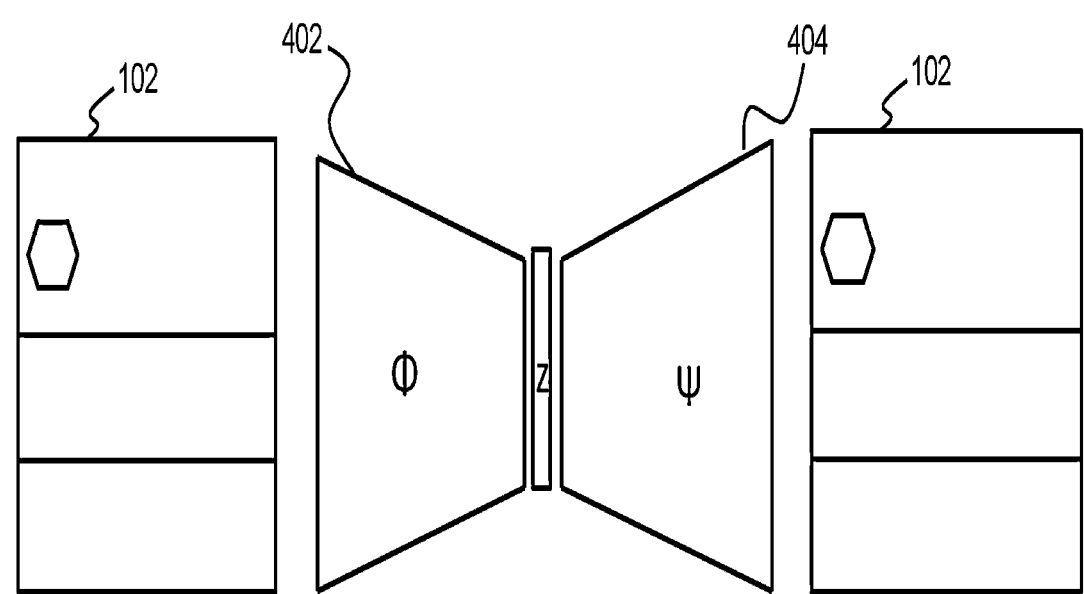
FIG. 4A illustrates a schematic of an auto-encoder network of the neural network operator, according to an example embodiment.

FIG. 4A shows a schematic of an auto-encoder network 400 of the neural network operator 116, according to an example embodiment. The auto-encoder network 400 comprises an encoder branch and a decoder branch. Particularly, the auto-encoder network 400 comprises an encoder network 402 and a generator network 404 (or decoder).

The auto-encoder network 400 may include a deep learning model for transforming data from a high-dimensional space to a lower-dimensional space. For example, the auto-encoder network 400 may be configured to transform an image formed based on the received reflections 306 or information relating to refractive indices of the one or more materials of the object 104 to a lower-dimensional space. For example, the encoder network 402 may encode image data, whatever its size, to a 1-D vector of smaller size than the image, i.e., lower-dimensional space. Further, the vector may be decoded to reconstruct the original data, i.e., the image by the generator network 404. The auto-encoder network 400 learns efficient data representations, i.e., encoding by training the encoder network 402 to ignore signal noise. Subsequently, the conversion of the low-dimensional image to original image by the auto-encoder network 400 may enable, for example, image de-noising.

The encoder network 402 is configured to map an internal structure of the object 104 to a low dimensional latent space. In an example, the encoder network 402 is configured to determine a low dimensional representation of an image, such as the current image or the image 102 of the refractive indices of the one or more materials in the object 104 in the low dimensional latent space. Further, the generator network 404 is configured to map from the low dimensional latent space to the internal structure of the object. For example, the generator network 404 is configured to decode the latent space representation to reproduce the image 102 or the current image of the refractive indices of the one or more materials of the object 104. To this end, the image of the refractive indices of the one or more materials is represented by the generator network 404 that maps the low dimensional latent space representation to the image of the refractive indices of the one or more materials.

Since inverse scattering problem in the GPR setting is highly ill-posed, the solutions of the generator network 404 are restricted to a lower-dimensional subspace represented as a range of a generative model, $\mathcal{G}_{\in}$. Given a training dataset comprising training examples of permittivity maps $\{\in_i\}_i$, the generator network or the generative model $\mathcal{G}_{\in}$ is trained by solving:

$$(\phi_{\mathcal{G}_\epsilon}^*, \phi_{\mathcal{E}}^*) = \text{argmin}_{\phi_{\mathcal{G}_\epsilon}, \phi_{\mathcal{E}}} \sum_i \left\| \mathcal{G}_\epsilon(\mathcal{E}(\epsilon_i; \phi_\mathcal{E}); \phi_{\mathcal{G}_\epsilon}) - \epsilon_i \right\|_2^2 + \frac{1}{\sigma^2} \| \mathcal{E}(\epsilon_i; \phi_\mathcal{E}) \|_2^2 \quad (2)$$

where $\mathcal{E}$ denotes an output of the encoder 402; $\mathcal{G}_{\in}$ denotes an output of the generator network 404, i.e. the learned generative prior; and $\phi \mathcal{G}_{\in}$ and $\phi_\mathcal{E}$ are the trained parameters for $\mathcal{G}_{\in}$ and $\mathcal{E}$, respectively.

The trained auto-encoder network 400 learns a parametric model that maps a low dimensional vector, z, to the target internal structure, $\in$, of the object 104 during optimization. The trained auto-encoder network 400 learns to optimize $z \in R^n$, rather than $\in \in R^{w \times h}$. Subsequently, the trained auto-encoder network 400 learns to constrain a solution space of a spatial distribution of permittivity map to be close to a target dataset distribution learned by the generator network 404.

The process for producing the synthesized wave-field using the neural network operator 116 requires the knowledge of a forward model. However, the forward model becomes non-trivial when the spatial distribution of the background medium permittivity, such as permittivity of the background mediums 220 and 222, is complicated. In order to determine the forward model, a computational domain is discretized into a uniformly sampled 2D grid, D. An input to the forward model is $$[\epsilon, u_{in,r}^\omega, u_{in,i}^\omega],$$

where $\epsilon$ is a total permittivity of the underground structure on the grid, and $$[u_{in,r}^\omega, u_{in,i}^\omega]$$

represents the real and imaginary parts of a free space response of the source on the grid at frequency $\omega$, i.e., the incident field with respect to the free space background medium. This is used to provide information of the frequency and the source of the probing pulse. The output of the forward model includes the real and the imaginary parts of the total field on the grid $$[u_r^\omega, u_i^\omega].$$

Figure 4B:
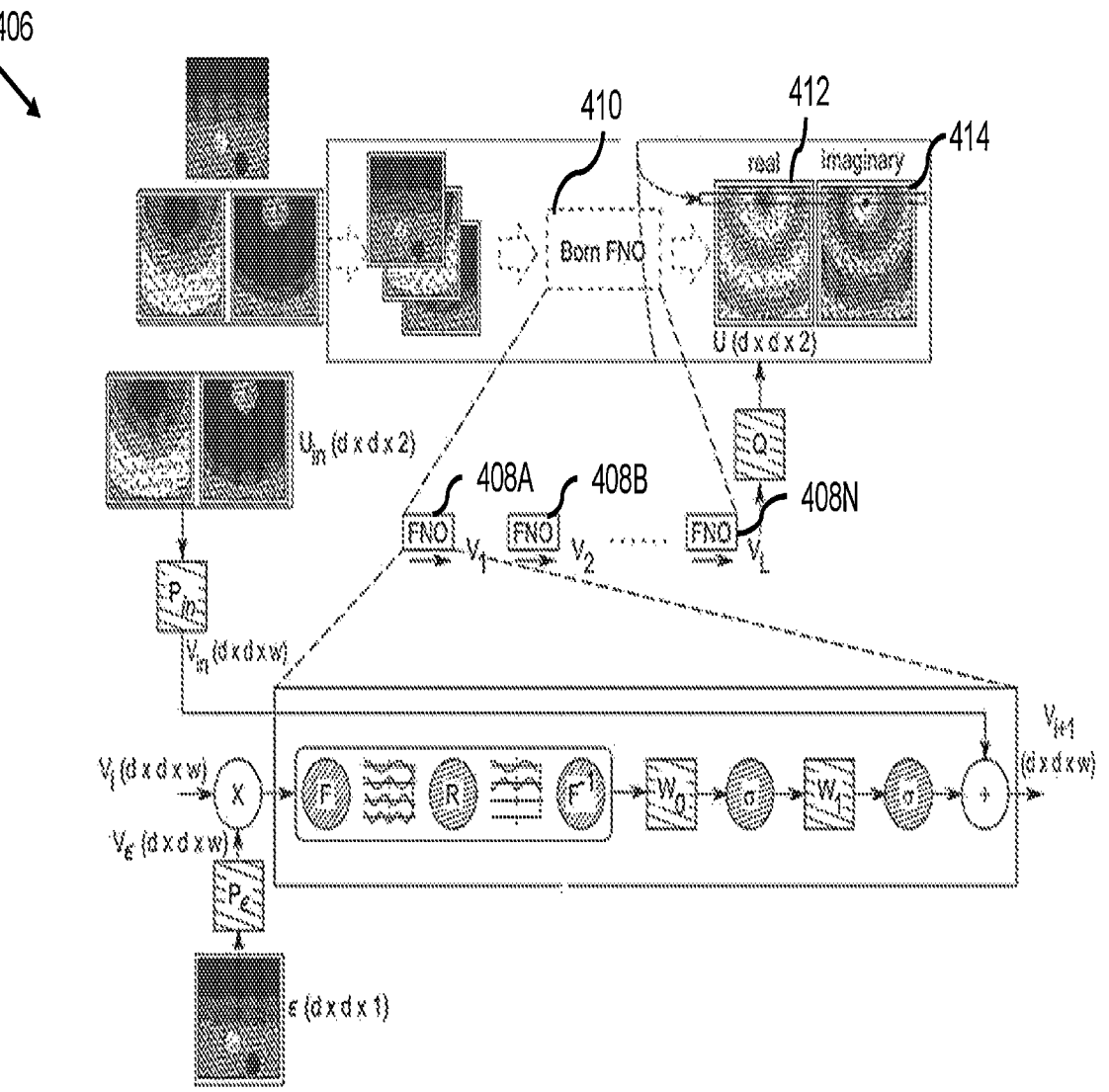
FIG. 4B illustrates a structure of a neural network operator, according to an example embodiment.

A manner in which the neural network generates the synthesized wave-field is described in conjunction with FIGS. 4B and 4C.

FIG. 4B shows a structure 406 of the neural network operator 116, according to an example embodiment. In an example, an architecture of the neural network operator 116 includes a sequence of Fourier neural operator (FNO) modules, depicted as FNO modules 408A, 408B, . . . , 408N (collectively referred to as FNO modules 408), with identical parameters enforced by training the neural network operator 116 with machine learning. In this regard, the FNO modules 408 are configured to learn a continuous function via parameterizing the auto-encoder network 400 in its function space. This makes it possible for the FNO modules 408 to be trained on one mesh or training dataset and subsequently evaluated on another.

In particular, the FNO modules 408 may form a Born FNO 410. In operation, the Born FNO module 410 may approximate an interaction between the probing pulse and scattered wave-field. The scattered wave-field may be resulted by scattering the probing pulse with the one or more materials inside the object 104, and refractive indices of the one or more materials inside the object 104. For example, the Born FNO module 410 may be formulated based on iterative born approximation as:

when $\forall x \in D$ $$v_\epsilon(X) = P_\epsilon(x, \epsilon(x)) \quad (3)$$

$$v_0^\omega(x) = v_{in}^\omega(x) = P_{in}(x, u_{in,r}^\omega(x), u_{in,i}^\omega(x)) \quad (4)$$

$$v_{i+1}^\omega(x) = v_{in}^\omega(x) + \sigma(W_1(\sigma(W_0(K(v_\epsilon, v_i^\omega)(x))))) \quad (5)$$

$$K(v_\epsilon, v_i^\omega)(x) = \mathcal{F}^{-1}(R \cdot \mathcal{F}(v_\epsilon v_i^\omega))(x) \quad (6)$$

$$u^\omega(x) = [u_r^\omega(x), u_i^\omega(x)] = Q(v_n^\omega(x)) \quad (7)$$

where $P_{\in}$, $P_{in}$, Q are local transformations parameterized by Multilayer Perceptron (MLPs), n is a number of BFNO layers or FNO modules 408, and $\sigma(\cdot)$ is the Rectified Linear Unit (ReLU) non-linearity. Note that the conventional FNO has different $R_i$, and $W_i$, i.e., parameters and weights for each layer. However, the FNO modules 408 of the Born FNO 410 of the present disclosure uses a same regularizer and a set of weights, for example, R, $W_0$, $W_1$ for all layers, which resembles the structure in the Iterative Born Approximation (IBA) formulation, as defined in Eq. (10) below. In an example, a normalization scheme may be used to preprocess the training data, and train the Born FNO module 410 with the normalized-mean-squared error as formulated in Eq. (8), as follows:

$$\phi_{BFNO}^{*} =$$
$$\underset{\phi_{BFNO}}{\mathrm{argmin}} \sum_{j} \sum_{\omega} \sum_{x \in D} \frac{\left\| u_{gt,j}^{\omega}(x) - BFNO(\epsilon_j, \omega; \phi_{BFNO})(x) \right\|_2}{\left\| u_{gt,j}^{\omega}(x) \right\|_2} \tag{8}$$

where $\phi_{BFNO}$ is the collection of network parameters for the BFNO module 410, $\epsilon_j$ is a permittivity map from the training dataset, and $$u_{gt,j}^{\omega}$$

is the ground truth total field for $\epsilon_j$ at frequency $\omega$. The determined collection of network parameters for the BFNO module 410 may be used to generate a synthesized wave-field based on a current image of the internal structure of the object and on the current set of frequencies of the probing pulse.

For example, the received reflection may form the current image that may be provided discretized and uniformly sampled into a 3D grid, D. Further, the 3D grid of the images may be provided to the Born FNO module 410 as input. In addition, real 412 and imaginary 414 parts of a free space response of the source on the grid at frequency $\omega$ may be provided as input to the Born FNO module. The Born FNO module 410 may operate to output real 412 and imaginary 414 parts of the total field on the grid $$[u_r^{\omega}, u_i^{\omega}]$$

of the scattered wave-field that may be reflected from the one or more materials inside the object 104. In an example, the Born FNO module 410 may be inverted to determine a Jacobian of the scattered wave-field with respect to the current image based on the refractive indices of the one or more materials. The inverse problem of the Born FNO module 410 is described in detail in conjunction with FIG. 4C.

FIG. 4C shows a schematic 416 of a process for solving an inverse problem to reconstruct the internal structure of the object 104, according to an example embodiment. The inverse problem to reconstruct the internal structure of the object 104 may be solved by the structure 406 of the neural network operator 116.

In an example, an optimization problem, defined in the Eq. (1), computes a latent space vector, z, that when passed through the generator network 404 of the auto-encoder network 400 produces an estimated internal structure of an object 104. The estimated internal structure of an object 104 may be generated as the permittivity distribution, f. The estimated internal structure of the object 104 and an incident wave-field are input to the Born FNO module 410 to output synthesized total wave-fields 420, L, comprising predicted dynamics of the internal structure of the object 104 and GT measurements of the received reflections 306 that are matched to the measured/received wave-field. The Born FNO module 410 may use the optimization problem 418 along with the generator network 404 to compute the internal structure of the object 104 while minimizing a difference between a portion of the scattered wave-field measured at the current set of frequencies and a wave-field synthetized from the current image. In this regard, the latent space vector is updated using a stochastic gradient descent approach to ensure that the synthesized total wave-fields match the measured wave-fields, thereby minimizing the difference for the current image. Details of the incremental frequency inversion 114 for reconstructing the image 102 of the internal structure of the object 104 is described in, for example, FIG. 5.

FIG. 5 shows a schematic 500 of principles of the incremental frequency inversion method 114, according to an example embodiment. The incremental frequency inversion method 114 (referred to as method 114, hereinafter) recursively reconstructs an image of the internal structure of the object 104 until a termination condition is met. For a current iteration, the method 114 adds a frequency to a previous set of frequencies used during a previous iteration to produce a current set of frequencies. Based on the current set of frequencies and the optimization problem, the neural network operator 116 of the Born FNO module 410 may reconstruct a current image of the internal structure of the object 104 that minimizes a cost function 502 indicative of a difference between a portion of the scattered wave-field measured at the current set of frequencies and a wave-field synthesized from the current image.

At global minima 518, the minimized cost function 502 produces the reflectivity parameters 304 of the image of the internal structure of the materials of the object 104. However, the cost function 502 has a complicated shape (much more complicated that in the simplified example of FIG. 5). Hence, the minimization of the cost function 502 may produce not the global minimum 518, but one of a number of local minima 516. The method 114 addresses the aforesaid problem.

For example, the set of frequencies for the method 114 includes frequencies, 10, 20, 30, 40, and 50 MHz. During a first iteration, the image is reconstructed by minimizing a cost function 506 only for the frequency of 10 MHz. For such a frequency, the reconstruction is more likely to find the global minimum 518. Next, the method 114 adds a frequency higher than one or more frequencies in the previous set of frequencies. For example, the method 114 adds the frequency of 20 MHz, and minimizes the cost function 508 for joint frequencies of 10 MHz and 20 MHz in the neighborhood of the minima corresponding to the function 506. Next, the method 114 adds the frequency of 30 MHz and minimizes the cost function 510 for joint frequencies of 10 MHz, 20 MHz and 30 MHz in the neighborhood of the minima corresponding to the function 508. Similarly, the method 114 adds the frequency of 40 MHz to minimize the cost function 512, and finally adds all the frequencies between 10-50 MHz together to minimize a total function 514 to find the global minimum 518 corresponding to the final image 102.

In such a manner, frequencies are added incrementally to the inverse scattering problem. In addition, a previous image determined during the previous iteration initializes the reconstruction of the current image. This initialization incrementally guides the solution of the inverse scattering problem toward the global minimizer 518.

The incremental frequency inversion method 114 does not require a smooth initial model of the image to be reconstructed. In contrast, the incremental frequency inversion method 114 derives such a model from low frequency measurements. In effect, the incremental frequency inversion method 114 allows reconstructing the image 102 of the internal structure of the object 104 with a practical resolution and accuracy without a necessity for using prior information about the image.

Frequency Inversion

According to some embodiments of the present disclosure, the image reconstruction problem may be formulated as a frequency inversion problem solved by incremental frequency inversion method 114. It is based on the recognition that a scattering model that describes a relation between the scattered wave-field and medium parameters of the one or more materials of the object 104. The scattering model allows to formulate a discrete inverse problem to reconstruct the medium or the one or more materials from the set of received reflections of the scattered wave-field.

Specifically, a wave-equation governs the acoustic or electromagnetic scattering from an inhomogeneous medium in a time domain. An equivalent representation in frequency domain is the scalar Helmholtz equation. The integral form of the Helmholtz equation is, for example, the scalar Lippmann-Schwinger equation.

Pursuant to present embodiment, $u_{sc}:\Omega \to \mathbb{C}$ may be assumed as the scattered wave-field inside a spatial domain or region of interest, $\Omega$. In such a case, if $f:\Omega \to \mathbb{R}$ is assumed as the medium parameters, the free-space Green's function may be denoted by $g:\Omega \to \mathbb{C}$. The scalar Lippman-Schwinger scattering equation is then defined as follows $$u_{sc}(x) = u_{in}(x) + k^2 \int_\Omega g(x-r) u_{sc}(r) f(r) dr, \ \forall x \in \Omega \qquad (9)$$

where, $u_{in}$ is the probing pulse transmitting the incident wave-field 108 generated by a transmitter of the transceiver 106, and $k = 2\pi/\lambda$ is the wave number with $\lambda$ denoting the wavelength. The medium parameters, $f(x) = (\varepsilon(x) - \varepsilon_b)$, is the relative permittivity, where $\varepsilon(x)$ is the permittivity of the object 104 and $\varepsilon_b$ is the permittivity of the background mediums 220 and 222, which is assumed to be the vacuum ($\varepsilon_{vacuum} = 1$).

Continuing further, the free-space Green's function for the Helmholtz equation $(\nabla^2 + k^2)g = \delta$ is given by:

$$g(x) \triangleq \begin{cases} -\dfrac{i}{2k}e^{-ikr} & d = 1 \\[2mm] -\dfrac{i}{4}H_0^{(2)}(kr) & d = 2 \\[2mm] \dfrac{1}{4\pi r}e^{-ikr} & d = 3 \end{cases},$$

where $r = \|x\|$, $H_0^{(2)}$ is the zero-order Hankel function of second kind, and d is the dimension of $\Omega$. The scattered wave-field 606 or the received reflections 306 are then measured by the receivers of the transceiver 106 resulting in the following data equation:

$$y(x) = \int_\Omega h(x-r) f(r) u_{sc}(r) dr, \ \forall x \in \Gamma, \qquad (10)$$

where $h:\Omega \to \mathbb{C}$ denotes the Green's function of the receiver and $\Gamma$ is the receiver domain. The forward problem involves computing the synthesized reflections or the synthesized wave-fields, y given by the probing pulse transmitting the incident wave-field 108, $u_{in}$, medium parameters or permittivity constricts of the object 104 and the background mediums 220 and 222, f, and the Green's functions, g and h.

In the discrete setting, the scattering equation and data equation reduce to the following system of linear equations for each transmitter illumination and wave number:

$$u = v + G\text{diag}(f)u, \qquad$$

$$y = H\text{diag}(f)u, \qquad (11)$$

where $u \in \mathbb{C}^N$ and $v \in \mathbb{C}^N$ are the scattered wave-field 606 and input probing pulse transmitting the incident wave-field 108, respectively; N denotes the number of gridpoints used to discretize the domain $\Omega$; $f \in \mathbb{R}^N$ denotes the medium parameters, while $G \in \mathbb{C}^{N \times N}$ and $H \in \mathbb{C}^{n_{rec} \times N}$ are the Green's functions of the domain and the receivers, respectively. Let $n_{rec}$ be a number of receivers in the transceiver 106 that discretizes the receiver domain $\Gamma$, then $y \in \mathbb{C}^{n_{rec}}$ is the noise-free scattered wave-field 606 measured at the receivers.

The forward problem involves estimating the scattered wave-field 606, u, by inverting a matrix A: $= I - G\text{diag}(f)$, where I denotes an identity operator. As the discretization dimension N increases, explicitly forming the matrix A and its inverse becomes prohibitively expensive. Therefore, a functional form of A along with the conjugate-gradient method (CG) may be used to perform the inversion. The convergence of CG depends on the conditioning of the operator A, which may become ill-conditioned for large wave number and high scattering medium, i.e., large value of $\|f\|_\infty$.

Figure 6:
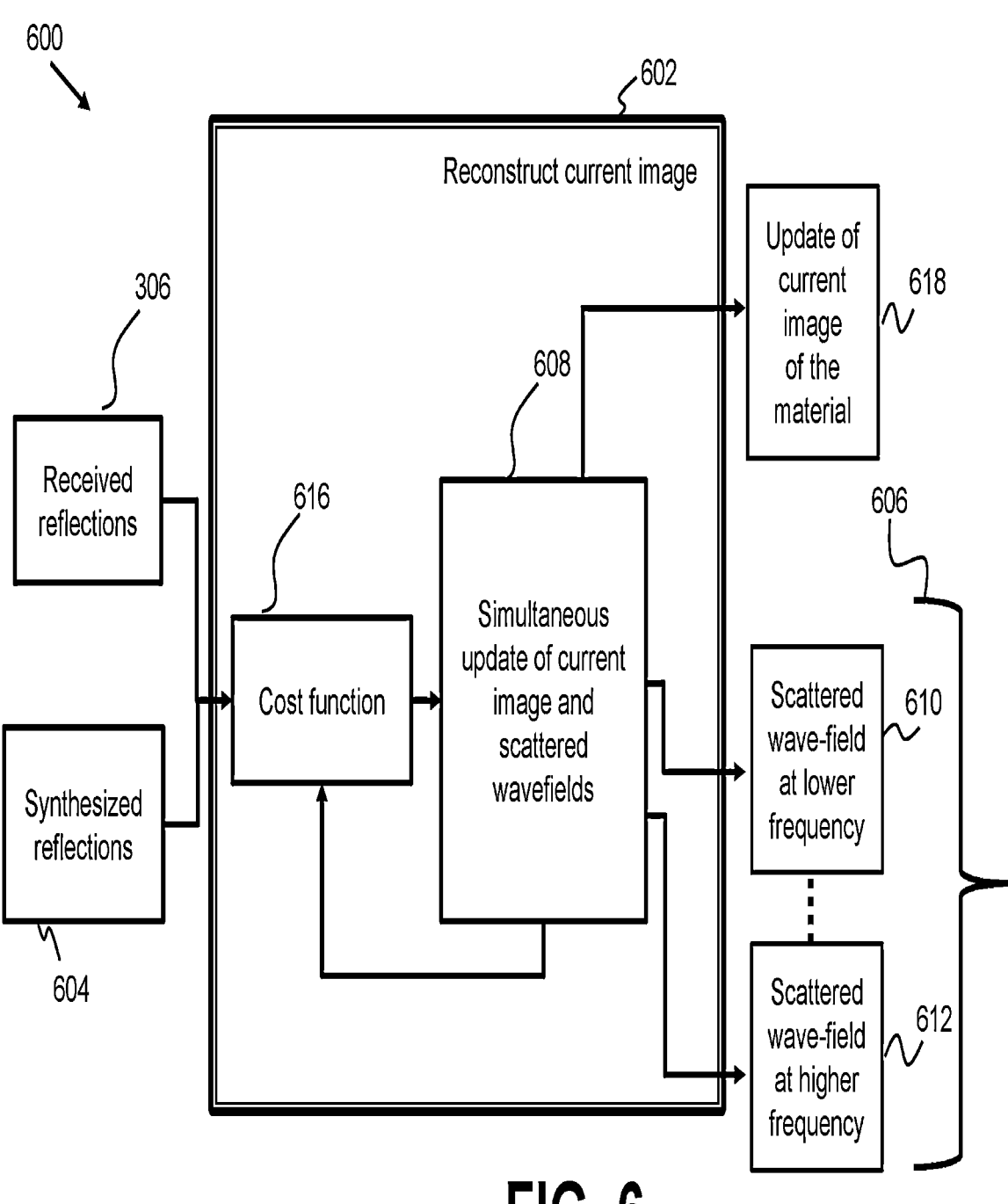
FIG. 6 illustrates a block diagram of a method for reconstructing a current image for different frequencies, according to an example embodiment.

FIG. 6 shows a block diagram 600 of a method for reconstructing a current image 602 for different frequencies, according to an example embodiment. The method is executed multiple times for different combinations of frequencies, i.e., based on a current set of frequencies for corresponding iteration. For example, in an iteration, the method is executed to reconstruct 602 an image by minimizing the cost function 508 for two frequencies, for example, 10 MHz and 20 MHz in the current set of frequencies. In the next iteration, the method is invoked to update 618 the image for frequencies 10 MHz, 20 MHz, and 30 MHz by minimizing the cost function 510. In this iteration, the image is updated 618 based on the previous reconstruction 602 of the image resulted from minimizing the cost function 508.

Given the current estimate of the image, synthesized reflections 604 are generated and compared to the received reflections 306. Both the synthesized reflections 604 and the received reflections 306 are determined for the current set of frequencies. A difference between the synthesized reflections 604 and the received reflections 306 is then minimized by simultaneously updating 608 the current image as well as estimates of the scattered wave-fields 610-612, collectively referred to as scattered wave-fields 606 at each frequency in the current set of frequencies. The updated current image and scattered wave-fields 610-612 are in turn used to minimize the cost function 616 of the difference between the synthesized reflections 604 and the received reflections 306. In some implementations, the cost function 616 is minimized by simultaneously estimating the current image and scattered wave-fields 610-612 or 606 at each frequency according to principles of disjoint-state method. The minimized metric of the cost function 616 may be selected from one or a combination of a Euclidean distance between the received reflections 306 and the synthesized reflections 604, a one norm distance between the received reflections 306 and the synthesized reflections 604, and a summation of Euclidean distance and a barrier function. For example, the barrier function penalizes updating the image of the refractive indices of the one or more materials of the object 104 that have negative refractive indices and the barrier function is a summation of an exponential function taken to a negative power of every refractive index in the image 602 of the refractive indices of the material.

Figure 7:
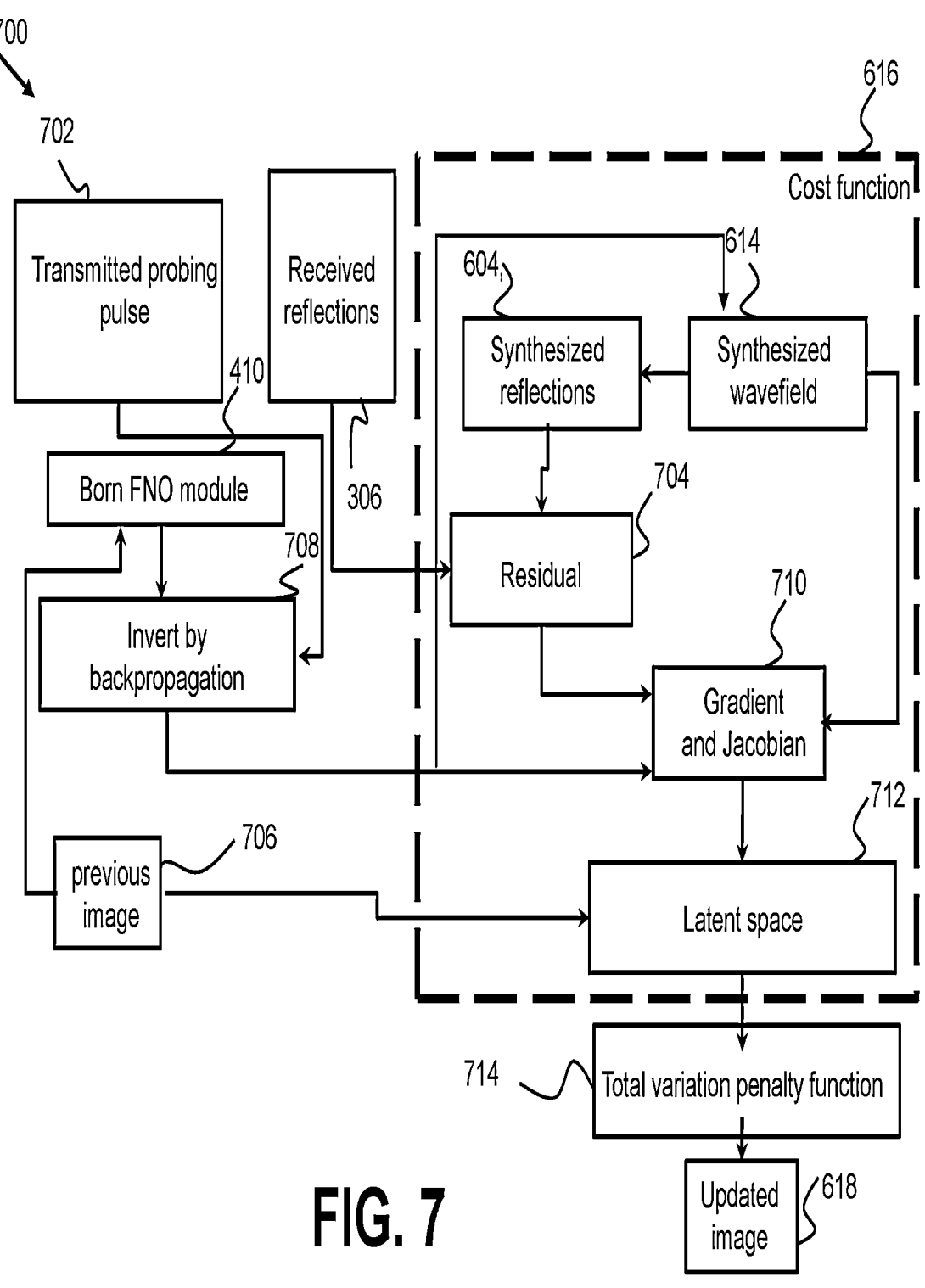
FIG. 7 illustrates a block diagram of a method for updating an image of a spatial distribution of permittivity of a material for a current set of frequencies, according to an example embodiment.

FIG. 7 shows a block diagram 700 of a method for updating an image of a spatial distribution of permittivity of a material for a current set of frequencies, according to an example embodiment. In this regard, the Born FNO module 410 that approximates a partial differential equation (PDE) such that the neural network operator 116 characterizes the interaction between a transmitted probing pulse 702 having a transmitted wave-field of the current set of frequencies and a previous estimate of image, i.e., previous image 706 of the distribution of permittivity of the material at all frequencies in the current set of frequencies. A function of the Born FNO module 410 is determined such that a product of the neural network operator 116 with the correct scattered wave-fields is equal to the transmitted probing pulse 702. Therefore, given the previous image 706 determined during a previous iteration and a portion of transmitted wave-field of the transmitted probing pulse 702 for the current set of frequencies, the function of the Born FNO module 410 is inverted 708 using a back-propagation method in order to estimate the scattered wave-fields. The received reflections 306 are then compared with the synthesized reflections 604 to update a residual 704. The residual 704 is used to update a gradient and Jacobian 710 of the image according to an adjoint state procedure. The image is then updated by modifying the latent space variables 712 using back-propagation and the result is projected onto a constrained total variation penalty function 714 to update 618 the image.

Inverse Problem

For solving the optimization problem defined in Eq. (1), the learned forward model may be combined with the learned prior model, where $\mathcal{R}(\bullet)$ is an isotropic total variation regularizer. With pre-trained BFNO($\bullet$; $\phi_{BFNO}^*$), and $\mathcal{G}_\epsilon(\bullet; \phi\mathcal{G}_\epsilon^*)$, the optimization problem may be solved, for example, using standard ADAM optimizer for, say, 1200 steps. It may be noted that the incremental frequency inversion method 114 may be used during the optimization or solving the optimization problem. In an example, the incremental frequency inversion method 114 may be implemented by including a batch of 10 frequencies every 120 update steps, i.e. $[\omega_0, \ldots, \omega_{10}]$ for the first 120 steps, $[\omega_0, \ldots, \omega_{20}]$ for the next 120 steps, and so forth. For example, the prior $\mathcal{G}_\epsilon$ may also be fine-tuned after, for example, 300 steps by updating the parameters $\phi\mathcal{G}_\epsilon$ of $\mathcal{G}_\epsilon$ during the optimization, as denoted in the Eq. (2). This fine-tuning procedure improves the generalization performance of $\mathcal{G}_\epsilon$ for the inverse problem. Similar techniques may be used in generative-adversarial network (GAN) inversion problems. Such GAN function may be denoted as:

$$\min_{z,\phi_{\mathcal{G}_\epsilon}} \sum_{\omega=\omega_1}^{\omega_n} \frac{1}{2} \left\| y_\omega - H\big(BFNO\big(\mathcal{G}_\epsilon(z; \phi_{\mathcal{G}_\epsilon}), \omega; \phi_{BFNO}^*\big)\big) \right\|_2^2 + \mathcal{R}\big(\mathcal{G}_\epsilon(z; \phi_{\mathcal{G}_\epsilon})\big) \quad (12)$$

The least-squares cost function 616 in the Eq. (1) provides a natural separation across the set of frequencies. Moreover, the topology of the non-convex cost function 616 varies drastically between the set of frequencies and may be leveraged to find a sequence of local minima that gradually lead to the global minimizer 518 of the inverse problem. As higher frequency wave-fields are introduced, the cost function starts to exhibit many local minima that are farther away from the global minimizer 518 compared to the low-frequency wave-fields.

Some embodiments are based on the recognition that when designing an incremental frequency inversion method 114, the spatial distribution of the permittivity of the materials of the object 104 is sequentially updated as higher frequencies are included in the inversion. Given the received reflections 306 containing the set of frequencies 118 of scattered wave-fields, $n_f$, frequency components may be indexed in an increasing order from 1 to $n_f$, the incremental frequency inversion method 114 iteratively estimates and reconstructs the current image 602 of the object 104 from low to high-frequency while keeping the low-frequency cost function as a regularizer for high-frequency inversions. Therefore, instead of solving a single non-convex minimization problem in the Eq. (1), some embodiments solve $n_f$ number of minimization problems sequentially according to Eq. (12), where $\omega_n$ is increased from $\omega_1$ to $\omega_{n_f}$, and consequently, the sequence of solutions moves us closer to the global minimizer 518.

In an example, a proximal Quasi-Newton method may be used to solve the $n_f$ number of minimization problems. In this regard, the gradient 710 of the function of the optimization problem of the Eq. (1) may be denoted as:

$$\mathcal{F}(f, u) \triangleq \mathcal{D}_k(f, u_k) + \sum_{j=1}^{k-1} \lambda_j \mathcal{D}_j(f, u_j) \quad (13)$$

with respect to the permittivity constrict, f, where the scattered wave-field, u, satisfies PDE constraints. Such gradient computation is performed using an adjoint-state method to simultaneously estimate the current image and the scattered wave-fields at each frequency. A descent direction is then obtained by forming an approximation to the Hessian using limited memory BFGS. A $(t+1)^{th}$-iterate of the neural network operator 116 is then given by:

$$f^{(t+1)} \triangleq \mathcal{P}_{TV\leq\tau}\left(f^{(t)} - \gamma_t \tilde{H}^{-1} \nabla_f \mathcal{F}\big(f^{(t)}, u\big)\right) \quad (14)$$

where $\gamma_t$ is a step length computed using backtracking line-search, $\tilde{H}$ is an L-BFGS Hessian, and $\mathcal{P}_{TV\leq\tau}(\bullet)$ is a proximal operator for the Total Variation (TV)-norm constrained by $\tau$. For each frequency batch, the neural network operator 116 is updated till a norm of the gradient 710 diminishes to a small value, such as less than a predefined threshold.

Total-Variation Regularization

For example, the TV-norm for a function $u:\Omega \to \mathbb{R}$ is represented with the help of bounded function $\phi$ as $$TV(u) \triangleq \sup\left\{ u(x) \ \mathrm{div}\,\phi \ dx: \phi \in C_c^1(\Omega, \mathbb{R}^d), \|\phi\|_\infty \leq 1 \right\}, = \quad (15)$$

$$\int_\Omega |\nabla u(x)| \ dx = \|\nabla u(x)\|_1$$

In an example, the TV-norm measures a total change in a derivative of the function of the neural network operator 116 over a finite domain. As a result, regularization with the TV-norm promotes piece-wise constant approximation of the true neural network operator 116.

According to some embodiments, the TV regularization may be used in its constrained form, such that, $$\mathcal{R}_{TV}(f) \triangleq \delta(TV(f) \leq \tau) \quad (16)$$

where δ(•) is an indicator function, and τ is a constraint parameter. Let D be a finite difference operator that discretizes the gradient 710, then TV(f)=‖Df‖₁.

In order to impose the TV-norm constraint, one embodiment defines the proximal operator as:

$$\mathcal{P}_{TV\leq\tau}(w) \triangleq \underset{f}{\arg\min}\left\{\frac{1}{2}\|f-w\|_2^2 + \mathcal{R}_{TV}(f)\right\} \tag{17}$$

which may be evaluated using the alternating direction method of multipliers (ADMM).

Figure 8:
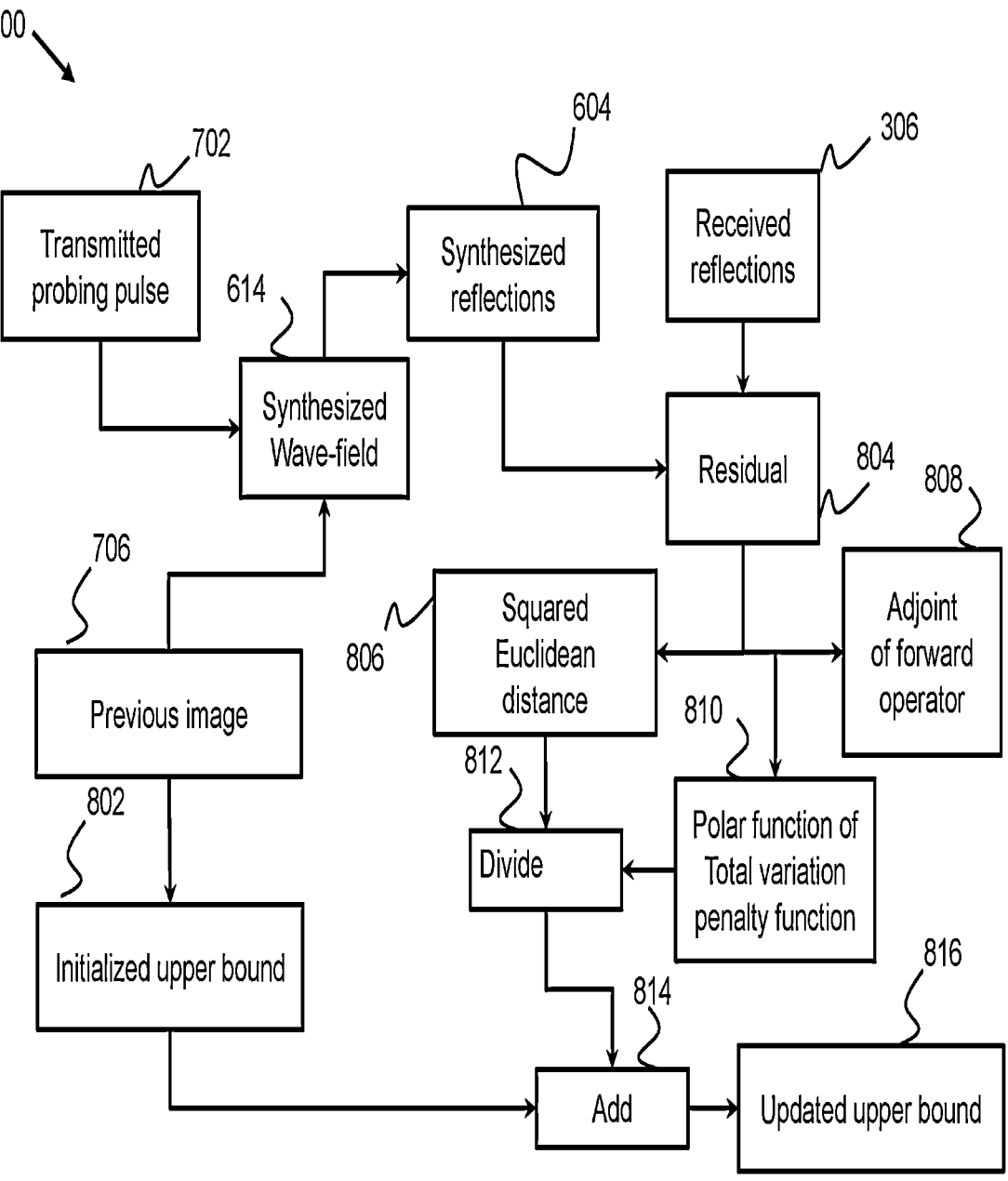
FIG. 8 illustrates a block diagram of a method for updating an upper bound of the total variation penalty function, according to an example embodiment.

FIG. 8 shows a block diagram 800 of a method for updating an upper bound 802, τ, of the total variation penalty function 714, according to an example embodiment. The FIG. 8 is explained in conjunction with elements of the FIG. 6 and FIG. 7.

Based on the previous image 706, the total variation penalty function 714 is evaluated to initialize the upper bound 802 on the total variation penalty function 714. The previous image 706 is also used to estimate the synthesized scattered wave-field 614 at the current set of frequencies by multiplying the inverse of the PDE operator A by the incident wave-field of the transmitted probing pulse 702. The upper bound 802 may have to be updated based on information from the received reflections 306 at the current set of frequency coefficients. From the current synthesized wave-fields 614 corresponding to the previous image 706, a residual 804, r, is computed. For example, the residual 804 is used to compute a squared Euclidean distance 806. Moreover, the residual 804 is used in conjunction with an adjoint of the forward operator 808, H, for example, a product of the residual 804 and the adjoint of the forward operator 808 is used, to produce a vector z=HTᵣ. A polar function of the total variation penalty function 810 is applied to the vector z. The polar function adjoint of the forward operator may be defined as a two-infinity mixed norm of the vector D𝓏, where D is a discretized gradient operator. The result is then used to divide 812 the squared Euclidean distance 806 for the difference. The resulting amount is then added 814 to the initial value of the upper bound 802 to produce the updated upper bound 816.

FIG. 9 shows an exemplar schematic 900 of an application of the system 102, according to an example embodiment. Pursuant to present example, the system 102 is used in a sensing setup for imaging underground infrastructure for, for example, geological discovery, excavation, etc. In this regard, a transmitter 902 and several receivers, depicted as receivers 904A, 904B, 904C and 904D (collectively referred to as receivers 904, hereinafter), are positioned above the ground 906. The transmitter 902 is configured to emit the probing pulse 702 that propagates through the ground 906 until it interacts with infrastructure objects, depicted as infrastructure objects 908A and 908B. The infrastructure objects 908A and 908B may include, for example, a water pipe or a solid structural beam, an electrical pipe, building foundation, etc. The infrastructure objects 908A and 908B may cause multiple wave scattering events. The interaction between the transmitted probing pulse 702 and the infrastructure objects 908A and 908B may result in reflected wave-fields that may be measured by the receivers 904 as received reflections 306. Based on embodiments described in the present disclosure, along with FIG. 1, FIG. 2A, FIG. 2B, FIG. 3, FIG. 4A, FIG. 4B, FIG. 4C, FIG. 5, FIG. 6, FIG. 7 and FIG. 8, the system 100 having the neural network operation 116 including the Born FNO module 410 is configured to reconstruct an image of the underground infrastructure depicting the internal structure inside of the ground 906 by estimating the background medium, i.e., permittivity of the soil inside the ground 906 using the neural network operator 116 and using the incremental frequency inversion method 114.

FIG. 10 shows an exemplar method 1000 for reconstructing an image, according to an example embodiment. The steps of the method 1000 may be implemented by the system 100. FIG. 10 is explained in conjunction with elements of the FIG. 1, FIG. 2A, FIG. 2B, FIG. 3, FIG. 4A, FIG. 4B, FIG. 4C, FIG. 5, FIG. 6, FIG. 7, FIG. 8 and FIG. 9.

At 1002, measurements at a set of frequencies of a wave-field scattered by an internal structure of the object 104 are received. The measurements may include, for example, the information relating to the received reflection 306. For example, the probing pulse 702 may transmit the incident wave-field 108, using the transmitter 902. The receiver 904 of the system 100 may receive the scattered wave-field 606 of the received reflections 306.

At 1004, an image of the internal structure of the object 104 is to recursively reconstructed until a termination condition is met. The image is recursively reconstructed using the incremental frequency inversion method 114 and the neural network operator 116. In an example, an architecture of the neural network operator 116 includes the sequence of Fourier neural operator (FNO) modules 408 with identical parameters, such as weights and regularizers that may be enforced by training the neural network operator 116 with machine learning. For reconstructing the image, the neural network operator is configured to reconstruct the image of the internal structure of the object 104 by solving an optimization problem that minimizes the difference between the measurements of the portion of the scattered wave-field 606, i.e., scattered wave-fields 606 of the received reflections 306 and the synthetized wave-field 614.

For a current iteration, the processor is configured add a frequency to a previous set of frequencies used during a previous iteration, that may be used to produce the previous image 706 to produce a current set of frequencies. In particular, a frequency that is higher than one or more frequencies present in the previous set of frequencies may be added to the previous set of frequencies to generate the current set of frequencies.

Thereafter, a current image of the internal structure of the object 104 may be reconstructed that minimizes a difference between the portion of the scattered wave-field 606 measured at the current set of frequencies and the synthesized wave-field 614 from the current image. In particular, the synthesized wave-field 614 may be generated from the current image by the neural network operator 116. The previous image 706 determined during the previous iteration initializes the reconstruction of the current image.

In certain cases, the update 618 of the current image of the internal structure of the object 104 and an estimate of the scattered wave-field 606 inside the object 104 may be determined simultaneously. The estimate of the scattered wave-field 606 may have a structure of the object 104 corresponding to the current image at each frequency in the current set of frequencies. Further, a sum of the differences between the received reflections 306 and the synthesized reflections 604 of reconstructed scattered wave-field 606 for each frequency in the current set of frequencies is minimized based on the update 618 of the current image and the estimate of the scattered wave-field 606.

In an example, to determine the update 618 of the current image of the internal structure of the object 104 and the estimate of the scattered wave-field 606 inside the object 104 simultaneously, the neural network operator 116 may form an optimization problem using the Born FNO module 410 to approximate an interaction between the probing pulse 702, the scattered wave-field 606 resulted by scattering the probing pulse 702 with the one or more materials inside the object 104, and refractive indices of the one or more materials inside the object 104. Further, the optimization problem of the Born FNO 410 may be inverted using the initialized current image to determine a Jacobian of the scattered wave-field 606 with respect to the current image based on the refractive indices of the one or more materials. Subsequently, the current image may be updated 618 based on the refractive indices of the one or more materials by minimizing a cost function between the received reflections 306 in the set of frequency components 118 and the synthesized scattered wave-fields 614. The refractive indices may be obtained by combining the Jacobian of the scattered wave-field 606 and a quasi-Newton descent direction of the cost function, such as the cost function 506, 508, 510, 512, 514 and 616 with respect to the image of the refractive indices of the one or more materials. For example, the current image of the refractive indices of the one or more materials may be projected onto the constrained total variation penalty function 714 to generate the updated image 618.

Such process of recursively generating the updated image may be performed until the termination condition is met by adding higher order frequency to existing set of frequencies and minimizing the difference between the received reflections 306 and the synthesized reflections 604. For example, the termination condition may be a time limit.

At 1006, the reconstructed image 102 of the internal structure of the object 104 is rendered. In an example, the reconstructed image 102 may be rendered on a display associated with the system 102. For example, the reconstructed image 102 is an image of refractive indices of one or more materials inside the object 104. Alternatively, the reconstructed image 102 includes a distribution (or spatial distribution) of permittivity of one or more materials inside the object 104.

Accordingly, blocks of the flowchart 1000 support combinations of means for performing the specified functions and combinations of operations for performing the specified functions. It will also be understood that one or more blocks of the flowchart 1000, and combinations of blocks in the flowchart 1000, can be implemented by special purpose hardware-based computer systems which perform the specified functions, or combinations of special purpose hardware and computer instructions.

Alternatively, the system 100 may comprise means for performing each of the operations described above. In this regard, according to an example embodiment, examples of means for performing operations may comprise, for example, a processor and/or a device or circuit for executing instructions or executing an algorithm for processing information as described above.

On implementing the method 1000 disclosed herein, the end result generated by the system 100 is a tangible high resolution image of the internal structure of an object depicting spatial distribution of permittivity of the one or more materials inside the object for performing several operations, such as geological exploration, oil exploration, human or animal anatomy exploration, etc.

Figure 11:
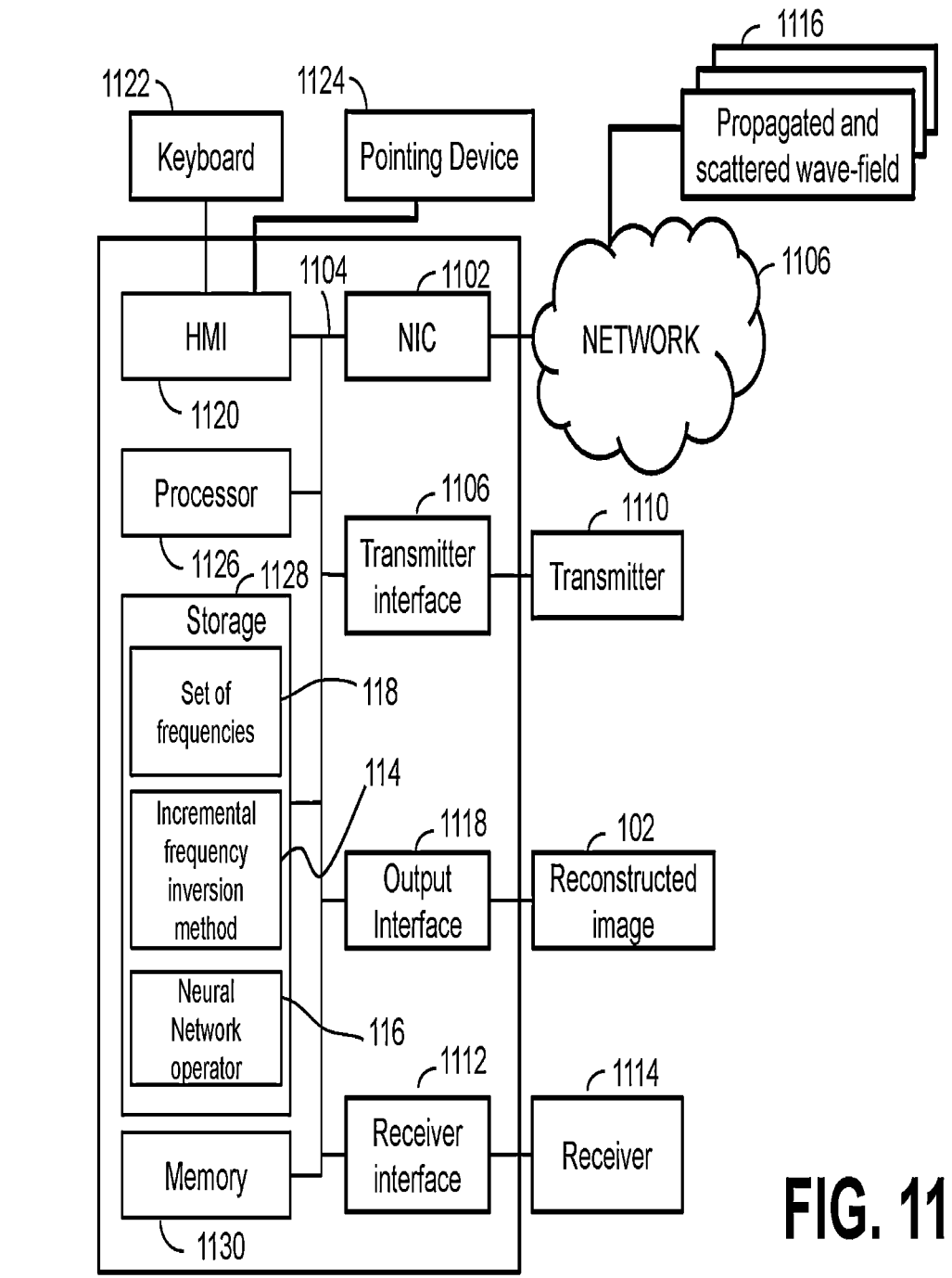
FIG. 11 illustrates a block diagram of a tomographic imaging system, according to an example embodiment.

FIG. 11 shows a block diagram 1100 of the tomographic imaging system 100 in accordance with some embodiments. The tomographic imaging system 100 may include a number of interfaces connecting the system 100 with other systems and devices. In this regard, a network interface controller (NIC) 1102 is configured to connect the system 100 through the bus 1104 to a network 1106 connecting the tomographic imaging system 100 with sensing devices (not shown). For example, the tomographic imaging system 100 includes a transmitter interface 1108 configured to command to a transmitter 1110 to emit a pulse wave or probing pulse 702. Using a receiver interface 1112 connected to a receiver 1114, the system 100 may receive the received reflections 306 of the scattered wave-field 606 corresponding to the transmitted probing pulse 702. In some implementations, the tomographic imaging system 100 receives the information 1116 about scattered wave-field and the transmitted probing pulse 702 through the network 1106.

The tomographic imaging system 100 includes the output interface 1118 configured to render the reconstructed image 102 for the object 104. For example, the output interface 1118 may display the reconstructed image 102 on a display device, store the image 102 into a storage medium and/or transmit the image 102 over the network 1106. For example, the system 100 may be linked through the bus 1104 to a display interface adapted to connect the system 100 to a display device, such as a computer monitor, camera, television, projector, or mobile device, among others. The system 100 may also be connected to an application interface adapted to connect the system to equipment for performing various tasks.

In some implementations, the tomographic imaging system 100 includes an input interface to receive measurements at a set of frequencies of a wave-field scattered by an internal structure of an object, such as an internal structure of a rock or an infrastructure object inside the ground. Examples of the input interface include NIC 1102, the receiver interface 1112, and a human machine interface (HMI) 1120. The HMI 1120 within the system 100 connects the system 100 to a keyboard 1122 and a pointing device 1124, etc. wherein the pointing device 1124 may include a mouse, a trackball, a touchpad, a joy stick, a pointing stick, a stylus, or a touch-screen, among others.

The system 100 includes a processor 1126 configured to execute stored instructions stored in a storage 1128, as well as a memory 1130 that stores instructions that are executable by the processor 1126. The processor 1126 may be a single core processor, a multi-core processor, a computing cluster, or any number of other configurations. The memory 1130 may include random access memory (RAM), read only memory (ROM), flash memory, or any other suitable memory systems. The processor 1126 may be connected through the bus 1104 to one or more input and output devices.

The instructions may implement a method for incremental frequency inversion 114 and the neural network operator 116. The instructions may include the trained neural network operator 116 for determining a pre-conditioner of the frequency inverse problem and a set of frequencies 118 for the incremental frequency inversion 114.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

Various embodiments are suitable for two acquisition modes in inverse scattering: transmission mode, where the transmitters and receivers are located on opposite sides of the material, and reflection mode, where the transmitters and receivers are located on the same side of the object. The reflection setup generally arises due to a limitation that allows accessing only one side of the material, as in the case of underground imaging. To that end, the reflection setup is effective in some applications, but results in the reflection tomography scenario where the inverse scattering problem is severely ill-posed since the received reflections contain far less spatial frequency information about the object. To that end, it is an object of one embodiment to provide method and system suitable for reflection tomographic imaging.

We claim:

1. A tomographic imaging system, comprising an input interface to receive measurements at a set of frequencies of a wave-field scattered by an internal structure of an object;

a processor configured to recursively reconstruct an image of the internal structure of the object until a termination condition is met, wherein, for a current iteration, the processor is configured to:

add a frequency to a previous set of frequencies used during a previous iteration to produce a current set of frequencies, wherein the added frequency is higher than one or more frequencies present in the previous set of frequencies; and reconstruct a current image of the internal structure of the object that minimizes a difference between a portion of the scattered wave-field measured at the current set of frequencies and a wave-field synthetized from the current image, wherein the wave-field synthesized from the current image is generated by a neural network operator, and wherein a previous image determined during the previous iteration initializes the reconstruction of the current image; and an output interface configured to render the reconstructed image.

2. The tomographic imaging system of claim 1, wherein an architecture of the neural network operator includes a sequence of Fourier neural operator (FNO) modules with identical parameters enforced by training the neural network operator with machine learning.

3. The tomographic imaging system of claim 1, wherein the processor is further configured to:

reconstruct the image of the internal structure of the object by solving an optimization problem that minimizes the difference between the measurements of the portion of the scattered wave-field and the synthetized wave-field.

4. The tomographic imaging system of claim 1, wherein the reconstructed image is an image of refractive indices of one or more materials inside the object.

5. The tomographic imaging system of claim 1, wherein the reconstructed image includes a distribution of permittivity of one or more materials inside the object.

6. The tomographic imaging system of claim 1, wherein to reconstruct the current image, the processor is further configured to:

determine an update of the current image of the internal structure of the object and an estimate of the scattered wave-field inside the object simultaneously, the estimate of the scattered wave-field having a structure corresponding to the current image at each frequency in the current set of frequencies; and based on the update of the current image and the estimate of the scattered wave-field, minimize a sum of the differences between received reflections and synthesized reflections of reconstructed scattered wave-field for each frequency in the current set of frequencies.

7. The tomographic imaging system of claim 6, wherein to determine the current image of the internal structure of the object and the estimate of the scattered wave-field inside the object simultaneously, the processor is further configured to:

determine an estimate of the scattered wave-field based on a current estimate of the image of the internal structure of the object by simulating an interaction between a probing pulse and the scattered wave-field resulted by scattering the probing pulse with one or more materials inside the object;

determine an estimate of an adjoint scattered wave-field that compensates for a residual error between the received reflections and the synthesized reflections of the reconstructed scattered wave-field; and compute the update of the current image of the internal structure of the object based on the estimate of the scattered wave-field, the estimate of the adjoint scattered wave-field, and the residual error between the received reflections and the synthesized reflections of the reconstructed scattered wave-field, using an adjoint state equation.

8. The tomographic imaging system of claim 7, wherein to determine the current image and the scattered wave-fields simultaneously, the processor is configured to:

form a Born Fourier Neural Operator (FNO) that approximates the interaction between the probing pulse, the scattered wave-field resulted by scattering the probing pulse with the one or more materials inside the object, and refractive indices of the one or more materials inside the object;

invert the Born FNO given an initialized current image to determine a Jacobian of the scattered wave-field with respect to the current image based on the refractive indices of the one or more materials;

update the current image based on the refractive indices of the one or more materials by minimizing a cost function between the received reflections in the set of frequency components and a synthesized scattered wave-fields obtained by one or combination of using a stochastic gradient descent approach determined by back-propagation of an automatically generated gradient, or by combining the Jacobian of the scattered wave-field and a quasi-Newton descent direction of the cost function with respect to the image of the refractive indices of the one or more materials; and project the image of the refractive indices of the one or more materials onto a constrained total variation penalty function.

9. The tomographic imaging system of claim 8, where the cost function between the received reflections and the synthesized reflections of the reconstructed scattered wave-field in the set of frequency components includes one or a combination of: an Euclidean distance between each of the received reflections and the corresponding synthesized reflections, a Wasserstein distance between each of the received reflections and the corresponding synthesized reflections, a norm distance between each of the received reflections and the corresponding synthesized reflections, or a summation of an Euclidean distance and a barrier function, wherein the barrier function penalizes updating the image of the refractive indices of the one or more materials that have negative refractive indices and the barrier function is a summation of an exponential function taken to a negative power of every refractive index in the image of the refractive indices of the one or more materials.

10. The tomographic imaging system of claim 8, wherein the image of the refractive indices of the one or more materials is represented by a generator network that maps a low dimensional latent space representation to the image of the refractive indices of the one or more materials.

11. The tomographic imaging system of claim 10, wherein the generator network is determined as part of an auto-encoder network, where an encoder network of the auto-encoder network is configured to determine a low dimensional representation of the image of the refractive indices of the one or more materials in a low dimensional latent space and the generator network of the auto-encoder network is configured to decode the latent space representation to reproduce the image of the refractive indices of the one or more materials.

12. The tomographic imaging system of claim 8, wherein the constrained total variation penalty function is constrained by an upper bound, wherein the processor is further configured to:

initialize the upper bound for the current image; and update the upper bound at the start of every iteration using a Newton root-finding method that adds a ratio of the square of the Euclidean distance between the received reflections and the synthesized reflections of the reconstructed scattered wave-field and a polar function of the constrained total variation function applied to a product of the adjoint of the Born FNO and the difference between the received reflections and the synthesized reflections of the reconstructed scattered wave-field.

13. The tomographic imaging system of claim 8, wherein the Born FNO operator approximates the interaction between the probing pulse, the scattered wave-field resulted by scattering the probing pulse with the one or more materials inside the object, and the refractive indices of the one or more materials inside the object, and wherein a structure of the Born FNO is determined by concatenating multiple Fourier Neural Operator modules into a multilayered neural network.

14. The tomographic imaging system of claim 1, wherein the object includes elements of an underground infrastructure.

15. The tomographic imaging system of claim 1, further comprising:

a set of transmitters configured to transmit one or more probing pulses into the object, wherein the one or more probing pulses include at least one of: an electromagnetic wave or an acoustic wave, that occupies a frequency band including the set of frequencies; and a set of receivers configured to measure, at each frequency from the set of frequencies, one or combination of reflections and refractions of propagation of the one or more probing pulses through the object to produce the measurements of the wave-field.

16. The tomographic imaging system of claim 15, wherein the set of transmitters and the set of receivers are located on a same side of the object, such that the tomographic imaging system operates in a reflection mode.

17. A tomographic imaging method, comprising receiving measurements at a set of frequencies of a wave-field scattered by an internal structure of an object;

recursively reconstructing an image of the internal structure of the object until a termination condition is met, wherein, for a current iteration, the method comprises:

adding a frequency to a previous set of frequencies used during a previous iteration to produce a current set of frequencies, wherein the added frequency is higher than one or more frequencies present in the previous set of frequencies; and reconstructing a current image of the internal structure of the object that minimizes a difference between a portion of the scattered wave-field measured at the current set of frequencies and a wave-field synthesized from the current image, wherein the wave-field synthesized from the current image is generated by a neural network operator, and wherein a previous image determined during the previous iteration initializes the reconstruction of the current image; and rendering the reconstructed image.

18. The tomographic imaging method of claim 17, wherein an architecture of the neural network operator includes a sequence of Fourier neural operator (FNO) modules with identical parameters enforced by training the neural network operator with a machine learning.

19. The tomographic imaging method of claim 17, further comprising:

reconstructing the image of the internal structure of the object by solving an optimization problem that minimizes the difference between the measurements of the portion of the scattered wave-field and the synthetized wave-field.

20. A non-transitory computer readable storage medium embodied thereon a program executable by a processor for performing a method, the method comprising:

receiving measurements at a set of frequencies of a wave-field scattered by an internal structure of an object;

recursively reconstructing an image of the internal structure of the object until a termination condition is met, wherein, for a current iteration, the method comprises:

adding a frequency to a previous set of frequencies used during a previous iteration to produce a current set of frequencies, wherein the added frequency is higher than one or more frequencies present in the previous set of frequencies; and reconstructing a current image of the internal structure of the object that minimizes a difference between a portion of the scattered wave-field measured at the current set of frequencies and a wave-field synthe-
tized from the current image, wherein the wave-field
synthesized from the current image is generated by a
neural network operator, and wherein a previous
image determined during the previous iteration ini-
tializes the reconstruction of the current image; and
rendering the reconstructed image.

\* \* \* \* \*